US012462925B2

(12) United States Patent
Shelton, IV et al.

(10) Patent No.: US 12,462,925 B2
(45) Date of Patent: Nov. 4, 2025

(54) LOCATION AND SURGICAL PROCEDURE SPECIFIC DATA STORAGE AND RETRIEVAL

(71) Applicant: Cilag GmbH International, Zug (CH)

(72) Inventors: Frederick E Shelton, IV, Hillsboro, OH (US); Kevin M. Fiebig, Cincinnati, OH (US)

(73) Assignee: Cilag GmbH International, Zug (CH)

( * ) Notice: Subject to any disclaimer, the term of this patent is extended or adjusted under 35 U.S.C. 154(b) by 400 days.

(21) Appl. No.: 17/384,128

(22) Filed: Jul. 23, 2021

(65) Prior Publication Data

US 2023/0025790 A1     Jan. 26, 2023

Related U.S. Application Data

(60) Provisional application No. 63/224,813, filed on Jul. 22, 2021.

(51) Int. Cl.
G16H 40/20      (2018.01)
A61B 17/00      (2006.01)
(Continued)

(52) U.S. Cl.
CPC .............. *G16H 40/20* (2018.01); *A61B 17/00* (2013.01); *A61B 18/1206* (2013.01);
(Continued)

(58) Field of Classification Search
CPC ........ G16H 40/20; G16H 10/60; G16H 15/00; G16H 20/40; G16H 30/40; G16H 40/40;
(Continued)

(56) References Cited

U.S. PATENT DOCUMENTS 6,766,373 B1   7/2004  Beadle et al.
8,565,073 B2  10/2013  Rahman et al.
(Continued)

FOREIGN PATENT DOCUMENTS

EP            3506287 A1    7/2019
WO    WO-2017089910 A1 *   6/2017  ............. A61B 34/00
WO         2019119130 A1    6/2019

OTHER PUBLICATIONS

ORHub (ORHB) Enhances Leading Data Analytics Platform with Integration of Sterilization Process Module, May 9, 2017, Internet Wire, pp. 1-2. (Year: 2017).*
(Continued)

*Primary Examiner* — Christopher L Gilligan
(74) *Attorney, Agent, or Firm* — Condo Roccia Koptiw LLP

(57) ABSTRACT

Systems, methods, and instrumentalities are disclosed for data storage and data retrieval based on processing, analysis, and/or usage needs. The data storage and data retrieval may include distributed and/or redundant data storage, for example, based on usage location of the data. Data storage and retrieval may be performed based on location and surgical procedure specific data. Data relating to, for example, a particular operating room and/or surgical procedure may be compiled and stored together. The data may be retrieved for future use. A surgical hub may obtain location and surgical procedure specific data for a specific location and surgical procedure. The surgical hub may generate surgical procedure information using the obtained location and surgical procedure specific data, for example, to use for an upcoming surgical procedure. The surgical hub may communicate the surgical procedure information to modules and/or surgical systems, for example, to perform the surgical procedure.

20 Claims, 15 Drawing Sheets

(51) Int. Cl.

| | | |
|---|---|---|
| A61B 18/12 | (2006.01) | |
| A61B 34/00 | (2016.01) | |
| A61B 34/10 | (2016.01) | |
| A61B 34/20 | (2016.01) | |
| A61B 34/30 | (2016.01) | |
| A61B 34/32 | (2016.01) | |
| A61B 90/00 | (2016.01) | |
| G05B 13/02 | (2006.01) | |
| G06F 3/14 | (2006.01) | |
| G06F 3/16 | (2006.01) | |
| G06F 9/48 | (2006.01) | |
| G06F 9/54 | (2006.01) | |
| G06F 13/40 | (2006.01) | |
| G06F 16/21 | (2019.01) | |
| G06F 16/28 | (2019.01) | |
| G06N 20/00 | (2019.01) | |
| G06Q 10/30 | (2023.01) | |
| G06T 11/60 | (2006.01) | |
| G08B 5/22 | (2006.01) | |
| G10L 15/22 | (2006.01) | |
| G16H 10/60 | (2018.01) | |
| G16H 15/00 | (2018.01) | |
| G16H 20/40 | (2018.01) | |
| G16H 30/40 | (2018.01) | |
| G16H 40/40 | (2018.01) | |
| G16H 40/63 | (2018.01) | |
| G16H 40/67 | (2018.01) | |
| G16H 50/20 | (2018.01) | |
| G16H 50/70 | (2018.01) | |
| H04L 1/22 | (2006.01) | |
| H04L 41/12 | (2022.01) | |
| H04L 65/80 | (2022.01) | |
| H04L 67/12 | (2022.01) | |
| H04L 67/125 | (2022.01) | |
| H04N 5/272 | (2006.01) | |
| H04N 7/15 | (2006.01) | |
| A61B 8/06 | (2006.01) | |
| A61B 18/00 | (2006.01) | |
| G06F 21/62 | (2013.01) | |
| G06F 40/169 | (2020.01) | |
| G16H 30/20 | (2018.01) | |
| H02J 7/00 | (2006.01) | |

(52) U.S. Cl.
CPC .............. *A61B 34/10* (2016.02); *A61B 34/20* (2016.02); *A61B 34/25* (2016.02); *A61B 34/30* (2016.02); *A61B 34/32* (2016.02); *A61B 90/08* (2016.02); *A61B 90/37* (2016.02); *G05B 13/0265* (2013.01); *G06F 3/14* (2013.01); *G06F 3/1423* (2013.01); *G06F 3/167* (2013.01); *G06F 9/4881* (2013.01); *G06F 9/542* (2013.01); *G06F 13/4068* (2013.01); *G06F 16/211* (2019.01); *G06F 16/284* (2019.01); *G06F 16/285* (2019.01); *G06N 20/00* (2019.01); *G06Q 10/30* (2013.01); *G06T 11/60* (2013.01); *G08B 5/22* (2013.01); *G10L 15/22* (2013.01); *G16H 10/60* (2018.01); *G16H 15/00* (2018.01); *G16H 20/40* (2018.01); *G16H 30/40* (2018.01); *G16H 40/40* (2018.01); *G16H 40/63* (2018.01); *G16H 40/67* (2018.01); *G16H 50/20* (2018.01); *G16H 50/70* (2018.01); *H04L 1/22* (2013.01); *H04L 41/12* (2013.01); *H04L 65/80* (2013.01); *H04L 67/12* (2013.01); *H04L 67/125* (2013.01); *H04N 5/272* (2013.01); *H04N 7/15* (2013.01); *A61B 8/06* (2013.01); *A61B 2017/00221* (2013.01); *A61B 2018/00702* (2013.01); *A61B 2018/00994* (2013.01); *A61B 2034/2072* (2016.02); *A61B 2034/254* (2016.02); *A61B 2090/364* (2016.02); *A61B 2090/365* (2016.02); *A61B 2090/373* (2016.02); *G06F 21/6245* (2013.01); *G06F 40/169* (2020.01); *G10L 2015/223* (2013.01); *G16H 30/20* (2018.01); *H02J 7/0063* (2013.01)

(58) Field of Classification Search
CPC ........ G16H 40/63; G16H 40/67; G16H 50/20; G16H 50/70; A61B 17/00; A61B 18/1206; A61B 34/10; A61B 34/20; A61B 34/25; A61B 34/30; A61B 34/32; A61B 90/37
See application file for complete search history.

(56) References Cited

U.S. PATENT DOCUMENTS

| | | | |
|---|---|---|---|
| 8,908,678 | B1 | 12/2014 | Mcgonigal et al. |
| 9,011,427 | B2 | 4/2015 | Price et al. |
| 9,283,054 | B2 | 3/2016 | Morgan et al. |
| 9,345,481 | B2 | 5/2016 | Hall et al. |
| 11,146,690 | B2 | 10/2021 | Minert |
| 2002/0000464 | A1 | 1/2002 | Ramberg et al. |
| 2005/0210070 | A1 | 9/2005 | Macneil |
| 2013/0092727 | A1* | 4/2013 | Edwards .............. G06K 15/024 235/375 |
| 2014/0160259 | A1 | 6/2014 | Blanquart et al. |
| 2014/0160260 | A1 | 6/2014 | Blanquart et al. |
| 2014/0263552 | A1 | 9/2014 | Hall et al. |
| 2014/0267655 | A1 | 9/2014 | Richardson et al. |
| 2015/0119035 | A1 | 4/2015 | Ganu et al. |
| 2015/0128274 | A1 | 5/2015 | Giokas |
| 2016/0249917 | A1* | 9/2016 | Beckman .............. A61B 17/068 227/175.3 |
| 2017/0296213 | A1 | 10/2017 | Swensgard et al. |
| 2018/0344308 | A1 | 12/2018 | Nawana et al. |
| 2018/0360452 | A1 | 12/2018 | Shelton, IV et al. |
| 2019/0191963 | A1 | 6/2019 | Kuhn et al. |
| 2019/0200844 | A1 | 7/2019 | Shelton, IV et al. |
| 2019/0200906 | A1 | 7/2019 | Shelton, IV et al. |
| 2019/0200980 | A1 | 7/2019 | Shelton, IV et al. |
| 2019/0200988 | A1 | 7/2019 | Shelton, IV |
| 2019/0201033 | A1 | 7/2019 | Yates et al. |
| 2019/0201102 | A1 | 7/2019 | Shelton, IV et al. |
| 2019/0201104 | A1 | 7/2019 | Shelton, IV et al. |
| 2019/0201115 | A1 | 7/2019 | Shelton, IV et al. |
| 2019/0201116 | A1* | 7/2019 | Shelton, IV .......... A61B 34/25 |
| 2019/0201123 | A1 | 7/2019 | Shelton, IV et al. |
| 2019/0201124 | A1 | 7/2019 | Shelton, IV et al. |
| 2019/0201125 | A1 | 7/2019 | Shelton, IV et al. |
| 2019/0201126 | A1 | 7/2019 | Shelton, IV et al. |
| 2019/0201127 | A1 | 7/2019 | Shelton, IV et al. |
| 2019/0201129 | A1 | 7/2019 | Shelton, IV et al. |
| 2019/0201137 | A1 | 7/2019 | Shelton, IV et al. |
| 2019/0201140 | A1 | 7/2019 | Yates et al. |
| 2019/0204201 | A1 | 7/2019 | Shelton, IV et al. |
| 2019/0205441 | A1 | 7/2019 | Shelton, IV et al. |
| 2019/0205566 | A1 | 7/2019 | Shelton, IV et al. |
| 2019/0205567 | A1 | 7/2019 | Shelton, IV et al. |
| 2019/0206216 | A1 | 7/2019 | Shelton, IV et al. |
| 2019/0206542 | A1 | 7/2019 | Shelton, IV et al. |
| 2019/0206551 | A1 | 7/2019 | Yates et al. |
| 2019/0206556 | A1 | 7/2019 | Shelton, IV et al. |
| 2019/0206562 | A1 | 7/2019 | Shelton, IV et al. |
| 2019/0206569 | A1 | 7/2019 | Shelton, IV et al. |
| 2019/0206576 | A1 | 7/2019 | Shelton, IV et al. |
| 2019/0207773 | A1 | 7/2019 | Shelton, IV et al. |
| 2019/0207857 | A1 | 7/2019 | Shelton et al. |
| 2019/0207911 | A1 | 7/2019 | Wiener et al. |
| 2019/0279765 | A1* | 9/2019 | Giataganas .............. G06F 3/014 |

(56) References Cited

U.S. PATENT DOCUMENTS

| | | |
|---|---|---|
| 2019/0333626 A1 | 10/2019 | Mansi et al. |
| 2020/0188047 A1* | 6/2020 | Itkowitz .................. A61B 46/00 |
| 2021/0193307 A1* | 6/2021 | Ma .......................... G06V 20/46 |
| 2021/0205031 A1 | 7/2021 | Shelton, IV |
| 2021/0212670 A1* | 7/2021 | Babaris .................. A61B 90/98 |
| 2021/0212717 A1 | 7/2021 | Yates et al. |
| 2022/0020476 A1 | 1/2022 | Souissi |
| 2022/0046292 A1 | 2/2022 | Nair et al. |
| 2022/0104713 A1 | 4/2022 | Shelton, IV |
| 2022/0104896 A1 | 4/2022 | Shelton, IV et al. |
| 2022/0108789 A1 | 4/2022 | Shelton, IV et al. |
| 2022/0233119 A1 | 7/2022 | Shelton, IV et al. |
| 2022/0233135 A1 | 7/2022 | Shelton, IV et al. |
| 2022/0233136 A1 | 7/2022 | Shelton, IV et al. |
| 2022/0233151 A1 | 7/2022 | Shelton, IV et al. |
| 2022/0233191 A1 | 7/2022 | Shelton, IV et al. |
| 2022/0233252 A1 | 7/2022 | Shelton, IV et al. |
| 2022/0233254 A1 | 7/2022 | Shelton, IV et al. |
| 2022/0238216 A1 | 7/2022 | Shelton, IV et al. |
| 2022/0240869 A1 | 8/2022 | Shelton, IV et al. |
| 2022/0241028 A1 | 8/2022 | Shelton, IV et al. |
| 2022/0241474 A1 | 8/2022 | Shelton, IV et al. |
| 2022/0303945 A1 | 9/2022 | Tsuda |
| 2023/0021920 A1 | 1/2023 | Shelton, IV et al. |
| 2023/0023083 A1 | 1/2023 | Shelton, IV et al. |
| 2023/0023635 A1 | 1/2023 | Shelton, IV et al. |
| 2023/0035775 A1 | 2/2023 | Kohada |
| 2023/0057639 A1* | 2/2023 | Foelsch .................. H04W 12/50 |
| 2023/0146057 A1* | 5/2023 | Moore ................... A61B 90/37 606/1 |

OTHER PUBLICATIONS

Jagannath, et al., "An Analysis of Speech as a Modality for Activity Recognition during Complex Medical Teamwork", Pervasive Computing Technologies for Healthcare, May 2018, pp. 1-10.

* cited by examiner

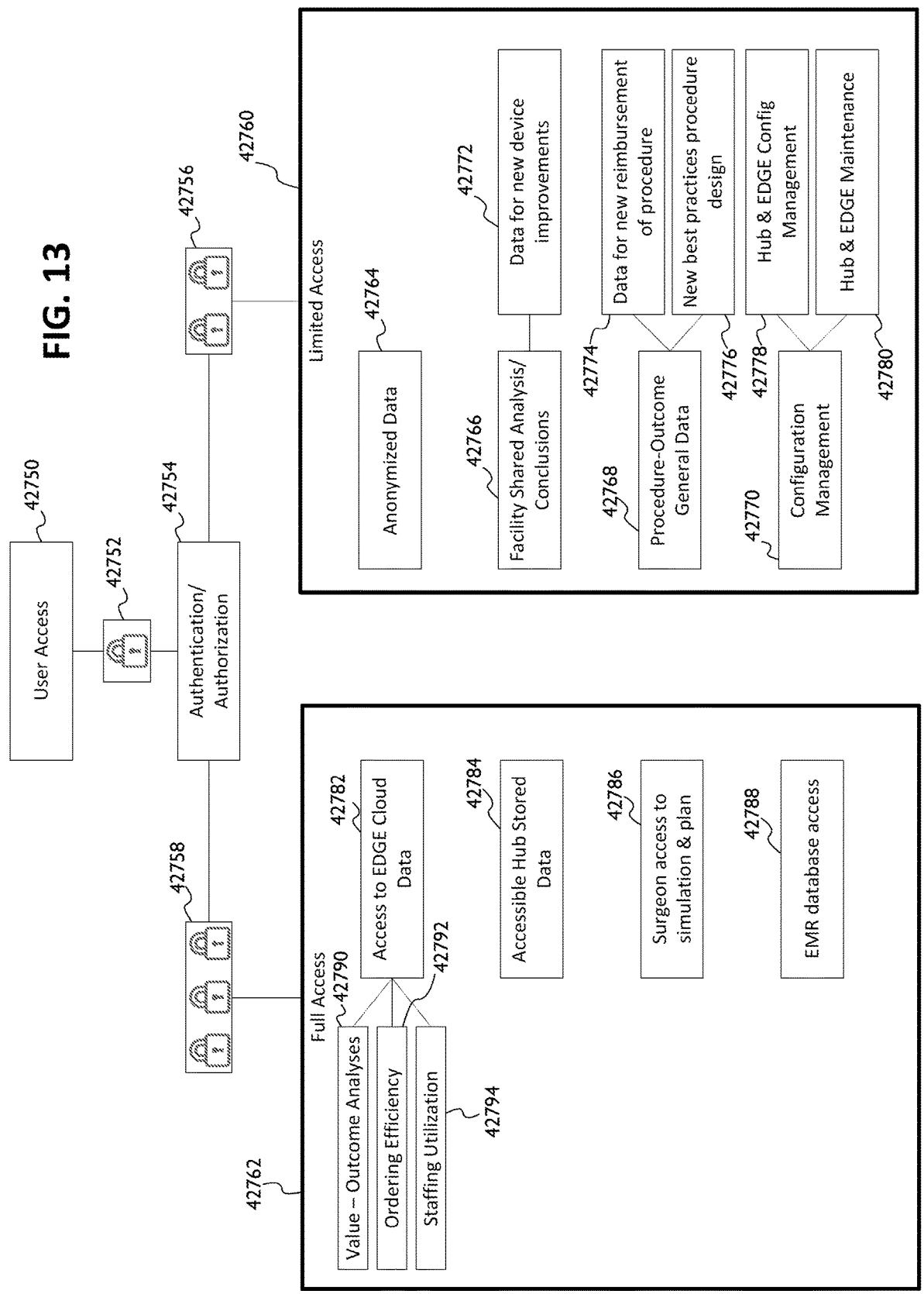

US 12,462,925 B2

LOCATION AND SURGICAL PROCEDURE SPECIFIC DATA STORAGE AND RETRIEVAL

CROSS-REFERENCE TO RELATED APPLICATIONS

This application claims the benefit of Provisional U.S. Patent Application No. 63/224,813, filed Jul. 22, 2021, the disclosure of which is incorporated herein by reference in its entirety.

BACKGROUND

Medical facilities may have multiple operating rooms (ORs). Surgical procedures may be performed in the different operating rooms, and some operating rooms may be designed for specific surgical procedures. For example, the ORs may include specialized ORs with advanced equipment. The OR may be set up differently based on the surgical procedure, for example, different equipment and devices may be used for different surgical procedures.

Preparing the OR for a surgical procedure can be hectic and involves coordination between the medical facility and HCPs. Preparing the OR may involve preparing surgical instruments and devices with the proper settings and control programs for the surgical procedure. Current mechanisms used for preparing the OR and surgical devices for a surgical procedure may be less efficient.

SUMMARY

Systems, methods, and instrumentalities are disclosed for data storage and data retrieval based on processing, analysis, and/or usage needs. The data storage and data retrieval may include distributed and/or redundant data storage based on usage location of the data. Data storage and retrieval may be performed based on location and surgical procedure specific data. Data relating to, for example, a particular operating room and/or a surgical procedure may be compiled and stored together. The data may be retrieved for future use. A surgical hub may obtain location and surgical procedure specific data for a specific location and a surgical procedure. The surgical hub may generate surgical procedure information using the location and surgical procedure specific data, for example, to use for an upcoming surgical procedure. The surgical hub may communicate the surgical procedure information to modules, modular devices, and/or surgical systems, for example, to perform the surgical procedure.

The surgical hub may be configured to determine its geographic location within a medical facility. The surgical hub may be configured to determine that the geographic location is associated with a second surgical hub. The surgical hub may be configured to send a request to data storage(s) to transfer location and surgical procedure specific data, for example, that may be associated with the second surgical hub. The surgical hub may be configured to obtain the location and procedure specific data from the data storage(s). The surgical hub may be configured to generate surgical procedure information for an upcoming surgical procedure, for example, based on the obtained location and surgical procedure specific data. The surgical hub, based on the obtained location and surgical procedure specific data, may send the surgical procedure information (e.g., using one or more control programs) to modules, systems, modular devices, and/or other surgical hubs, for example, to perform the surgical procedure.

Generated surgical procedure data from a performed surgical procedure may be stored in the data storage(s). The generated surgical procedure data may be stored in the data storage(s), for example, based on the geographic location of the surgical procedure and the type of surgical procedure performed. The generated surgical procedure data may be compiled and stored for later use. For example, the generated surgical procedure data may be the location and surgical procedure specific data requested for a future surgical procedure.

BRIEF DESCRIPTION OF THE DRAWINGS

FIG. 13 illustrates an example multi-level security system for a data storage.

DETAILED DESCRIPTION

Figure 1A:
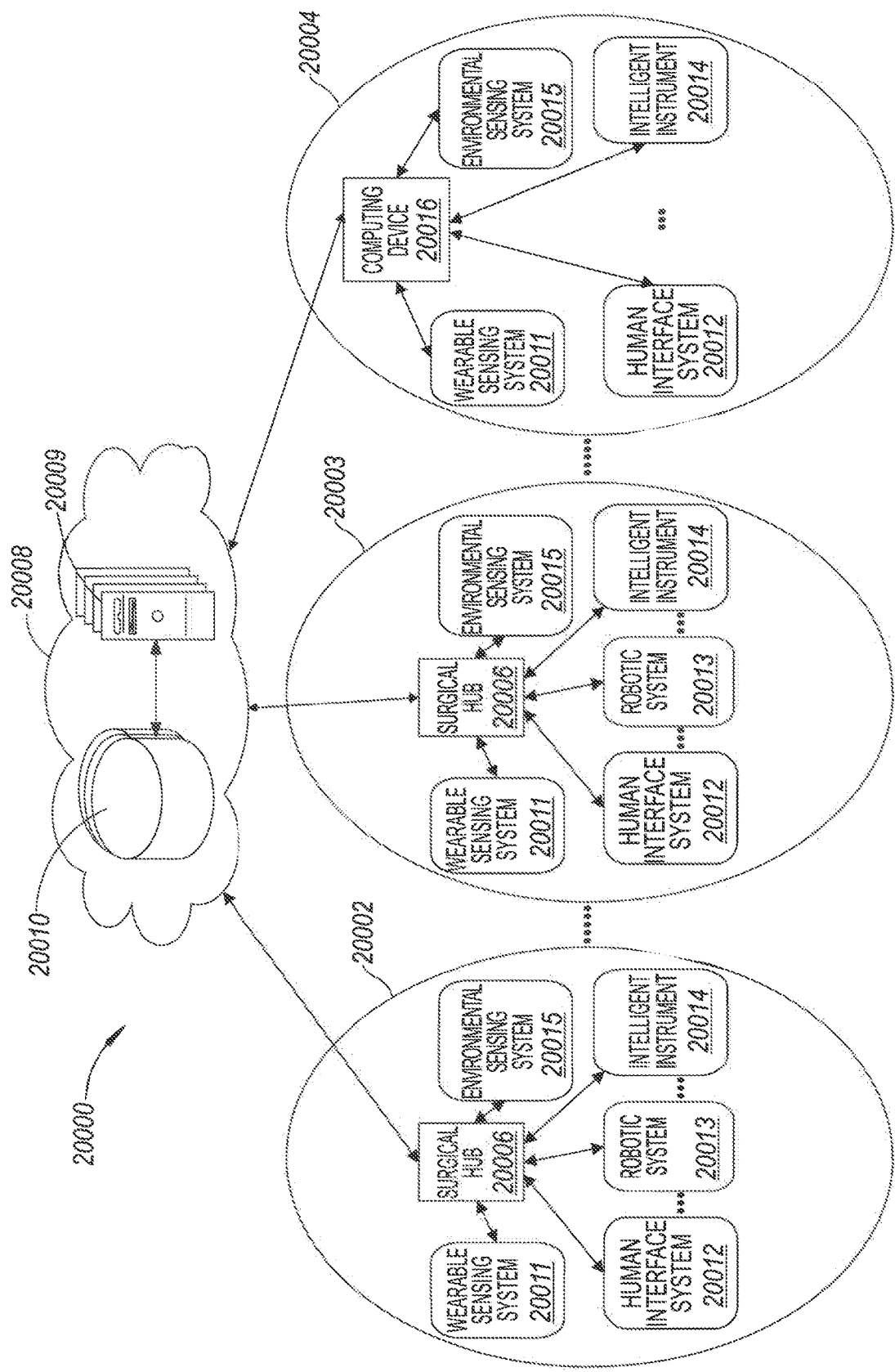
FIG. 1A is a block diagram of a computer-implemented surgical system.

FIG. 1A is a block diagram of a computer-implemented surgical system 20000. An example surgical system such as the surgical system 20000 may include one or more surgical systems (e.g., surgical sub-systems) 20002, 20003 and 20004. For example, surgical system 20002 may include a computer-implemented interactive surgical system. For example, surgical system 20002 may include a surgical hub 20006 and/or a computing device 20016 in communication with a cloud computing system 20008, for example, as described in FIG. 2. The cloud computing system 20008 may include at least one remote cloud server 20009 and at least one remote cloud storage unit 20010. Example surgical systems 20002, 20003, or 20004 may include a wearable sensing system 20011, an environmental sensing system

20015, a robotic system 20013, one or more intelligent instruments 20014, human interface system 20012, etc. The human interface system is also referred herein as the human interface device. The wearable sensing system 20011 may include one or more HCP sensing systems, and/or one or more patient sensing systems. The environmental sensing system 20015 may include one or more devices, for example, used for measuring one or more environmental attributes, for example, as further described in FIG. 2. The robotic system 20013 may include a plurality of devices used for performing a surgical procedure, for example, as further described in FIG. 2.

The surgical system 20002 may be in communication with a remote server 20009 that may be part of a cloud computing system 20008. In an example, the surgical system 20002 may be in communication with a remote server 20009 via an internet service provider's cable/FIOS networking node. In an example, a patient sensing system may be in direct communication with a remote server 20009. The surgical system 20002 and/or a component therein may communicate with the remote servers 20009 via a cellular transmission/reception point (TRP) or a base station using one or more of the following cellular protocols: GSM/GPRS/EDGE (2G), UMTS/HSPA (3G), long term evolution (LTE) or 4G, LTE-Advanced (LTE-A), new radio (NR) or 5G.

A surgical hub 20006 may have cooperative interactions with one of more means of displaying the image from the laparoscopic scope and information from one or more other smart devices and one or more sensing systems 20011. The surgical hub 20006 may interact with one or more sensing systems 20011, one or more smart devices, and multiple displays. The surgical hub 20006 may be configured to gather measurement data from the one or more sensing systems 20011 and send notifications or control messages to the one or more sensing systems 20011. The surgical hub 20006 may send and/or receive information including notification information to and/or from the human interface system 20012. The human interface system 20012 may include one or more human interface devices (HIDs). The surgical hub 20006 may send and/or receive notification information or control information to audio, display and/or control information to various devices that are in communication with the surgical hub.

For example, the sensing systems 20001 may include the wearable sensing system 20011 (which may include one or more HCP sensing systems and one or more patient sensing systems) and the environmental sensing system 20015 as discussed in FIG. 1A. The one or more sensing systems 20001 may measure data relating to various biomarkers. The one or more sensing systems 20001 may measure the biomarkers using one or more sensors, for example, photosensors (e.g., photodiodes, photoresistors), mechanical sensors (e.g., motion sensors), acoustic sensors, electrical sensors, electrochemical sensors, thermoelectric sensors, infrared sensors, etc. The one or more sensors may measure the biomarkers as described herein using one of more of the following sensing technologies: photoplethysmography, electrocardiography, electroencephalography, colorimetry, impedimentary, potentiometry, amperometry, etc.

The biomarkers measured by the one or more sensing systems 20001 may include, but are not limited to, sleep, core body temperature, maximal oxygen consumption, physical activity, alcohol consumption, respiration rate, oxygen saturation, blood pressure, blood sugar, heart rate variability, blood potential of hydrogen, hydration state, heart rate, skin conductance, peripheral temperature, tissue perfusion pressure, coughing and sneezing, gastrointestinal motility, gastrointestinal tract imaging, respiratory tract bacteria, edema, mental aspects, sweat, circulating tumor cells, autonomic tone, circadian rhythm, and/or menstrual cycle.

The biomarkers may relate to physiologic systems, which may include, but are not limited to, behavior and psychology, cardiovascular system, renal system, skin system, nervous system, gastrointestinal system, respiratory system, endocrine system, immune system, tumor, musculoskeletal system, and/or reproductive system. Information from the biomarkers may be determined and/or used by the computer-implemented patient and the surgical system 20000, for example. The information from the biomarkers may be determined and/or used by the computer-implemented patient and the surgical system 20000 to improve said systems and/or to improve patient outcomes, for example. The one or more sensing systems 20001, biomarkers 20005, and physiological systems are described in more detail in U.S. application Ser. No. 17/156,287, titled METHOD OF ADJUSTING A SURGICAL PARAMETER BASED ON BIOMARKER MEASUREMENTS, filed Jan. 22, 2021, the disclosure of which is herein incorporated by reference in its entirety.

Figure 1B:
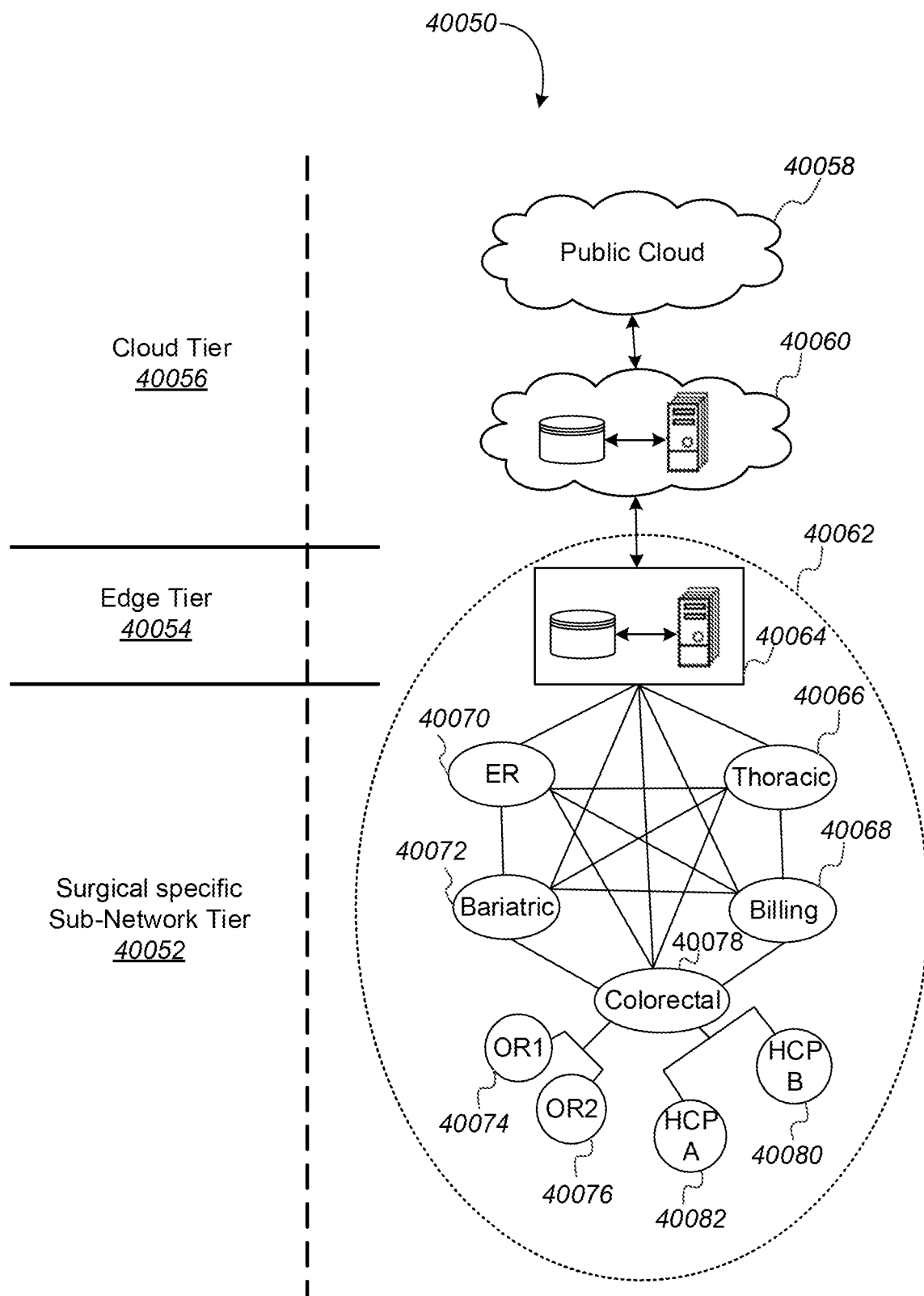
FIG. 1B is a block diagram of a computer-implemented multi-tier surgical system.

FIG. 1B is a block diagram of a computer-implemented multi-tier surgical system. As illustrated in FIG. 1B, a computer-implemented multi-tier surgical system 40050 may include multiple tiers of systems, such as a surgical specific sub-network tier system 40052, an edge tier system 40054 that is associated with the surgical specific sub-network tier system 40052, and a cloud tier system 40056.

A surgical specific sub-network tier system 40052 may include a plurality of inter-connected surgical sub-systems. For example, the surgical sub-systems may be grouped by the type of surgical procedures and/or other departments in a medical facility or a hospital. For example, a medical facility or a hospital may include a plurality of surgical procedure specific departments, such as an emergency room (ER) department 40070, colorectal department 40078, bariatric department 40072, thoracic department 40066, and billing department 40068. Each of the surgical procedure specific departments may include one or more surgical sub-systems associated with an operating room (OR) and/or a healthcare care professional (HCP). For example, the colorectal department 40078 may include a set of surgical hubs (e.g., surgical hub 20006 as described in FIG. 1A). The surgical hubs may be designated for a respective HCP, such as HCP A, 40082 and HCP B, 40080. In an example, the colorectal department may include a group of surgical hubs that may be located in respective ORs, such as OR1, 40074 and OR2, 40076. The medical facility or the hospital may also include a billing department subsystem 40068. The billing department subsystem 40068 may store and/or manage billing data associated with a respective department, such as the ER department 40070, colorectal department 40078, bariatric department 40072, and/or thoracic department 40066.

An edge tier system 40054 may be associated with a medical facility or a hospital and may include one or more edge computing systems 40064, for example. An edge computing system 40064 may include a storage sub-system and a server sub-system. In an example, the edge computing system comprising an edge server and/or a storage unit may provide additional processing and/or storage services to a surgical hub that is part of one of the departmental ORs (e.g., OR1 and OR2 of the colorectal department).

The surgical specific sub-network tier system 40052 and the edge tier system 40054 may be located within a Health Insurance Portability and Accountability Act (HIPAA) boundary 40062. The surgical specific sub-network system 40052 and the edge tier system 40054 may be connected to the same local data network. The local data network may be a local data network of a medical facility or a hospital. The local data network may be within the HIPAA boundary. Because the surgical specific sub-network tier system 40052 and the edge tier system 40054 are located within the HIPAA boundary 40062, patient data between an edge computing system 40064 and a device located within one of the entities of the surgical specific sub-network tier system 40052 may flow without redaction and/or encryption. For example, patient data between an edge computing system 40064 and a surgical hub located in OR1 40074 of the colorectal department 40078 may flow without redaction and/or encryption.

The cloud tier system 40056 may include an enterprise cloud system 40060 and a public cloud system 40058. For example, the enterprise cloud system 40060 may be a cloud computing system 20008 that includes a remote cloud server sub-system and/or a remote cloud storage subsystem, as described in FIG. 1A. The enterprise cloud system 40060 may be managed by an organization, such as a private company. The enterprise cloud system 40060 may be in communication with one or more entities (e.g., edge computing systems 40064, surgical hubs located in ORs (e.g., OR1 40074) of the various departments (e.g., colorectal department 40078)) that are located within the HIPAA boundary 40062.

The public cloud system 40058 may be operated by a cloud computing service provider. For example, the cloud computing service provider may provide storage services and/or computing services to a plurality of enterprise cloud systems (e.g., enterprise cloud system 40060).

Figure 1C:
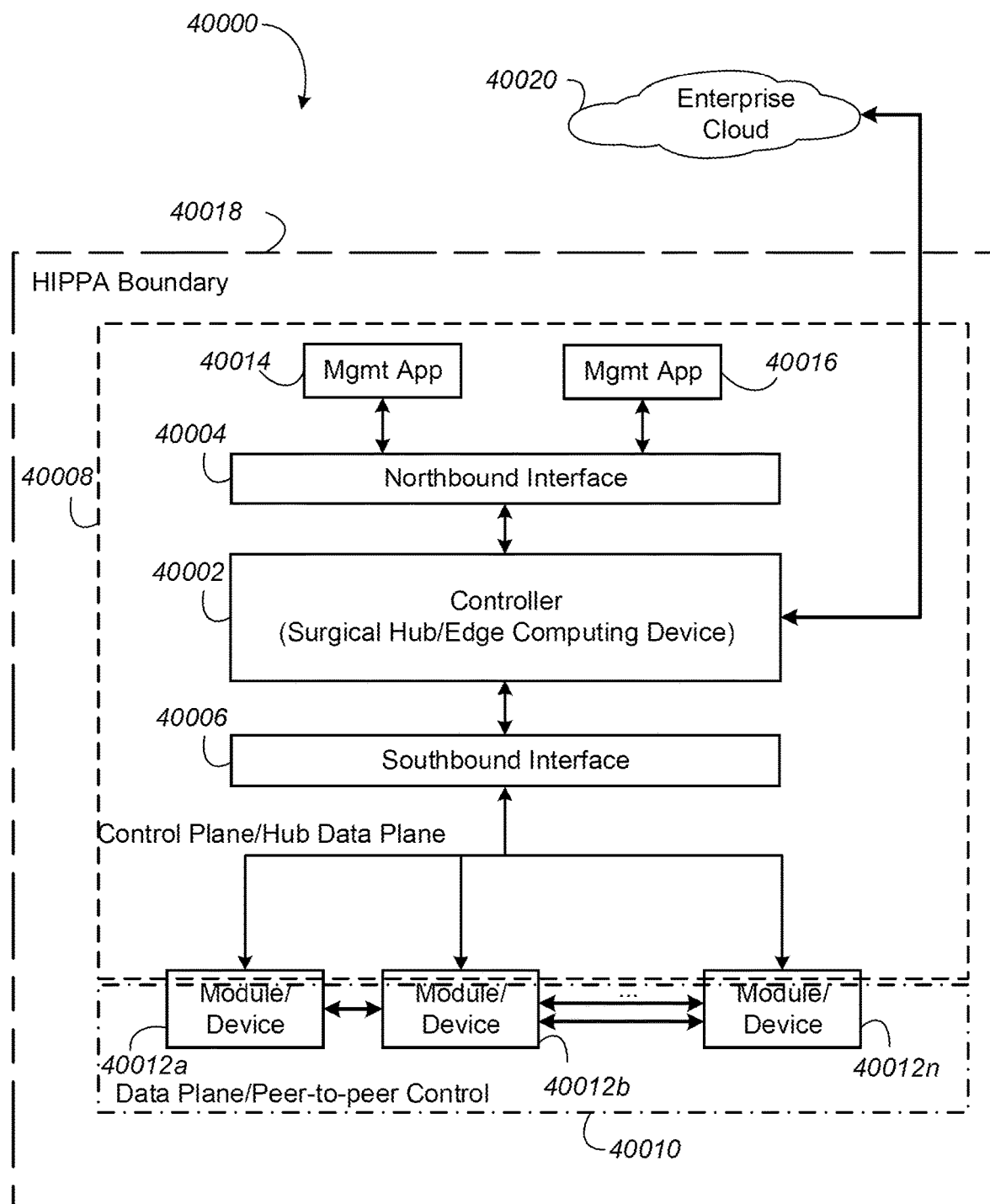
FIG. 1C is a logical diagram illustrating control plane and data plane of a surgical system.

FIG. 1C is a logical block diagram 40000 illustrating various communication planes in a surgical system. As illustrated in FIG. 1C, the communication planes between a controller 40002 and management applications 40014 and 40016 on one side and, the system modules and/or modular devices 40012a through 40012n on the other side, may use control plane 40008 and data plane 40010. In an example, in addition to the control plane 40008, a data plane may also exist between the system modules and/or modular devices 40012a through 40012n and the surgical hub. The data plane 40010 may provide data plane paths (e.g., redundant data plane paths) between the system modules and/or the modular devices 40012a through 40012n that are associated with one or more surgical hubs. A surgical hub or one of the surgical hubs (e.g., in case of a plurality of surgical hubs present in an operating room) may act as a controller 40002. In an example, the controller 40002 may be an edge computing system that may reside within a Health Insurance Portability and Accountability Act (HIPAA) boundary where the surgical system is located, for example, as illustrated in FIG. 1B. The controller 40002 may be in communication with an enterprise cloud system 40020. As illustrated in FIG. 1C, the enterprise cloud system 40020 may be located outside the HIPAA boundary 40018. Accordingly, the patient data flowing to and/or from the enterprise cloud system 40020 may be redacted and/or encrypted.

The controller 40002 may be configured to provide a northbound interface 40004 and a southbound interface 40006. The northbound interface 40004 may be used for providing a control plane 40008. The control plane 40008 may include one or more management applications 40014 and 40016 that may enable a user to configure and/or manage system modules and/or modular devices modular devices 40012a through 40012n associated with a surgical system. The management applications 40014 and 40016 may be used to obtain status of various system modules and/or the modular devices 40012a through 40012n.

The management applications 40014 and 40016 using the control plane may interact with the controller 40002, for example, using a set of application programming interface (API) calls. The management applications 40014 and 40016 may interact with the controller 40002 via a management protocol or an application layer protocol to configure and/or monitor the status of a system module and/or a modular device. The management protocols or the application layer protocols used to monitor the status and/or configure a system module or a modular device associated with a surgical system may include the simple network management protocol (SNMP), TELNET protocol, secure shell (SSH) protocol, network configuration protocol (NETCONF), etc.

SNMP or a similar protocol may be used to collect status information and/or send configuration related data (e.g., configuration related control programs) associated with system modules and/or modular devices to the controller. SNMP or a similar protocol may collect information by selecting devices associated with a surgical system from a central network management console using messages (e.g., SNMP messages). The messages may be sent and/or received at fixed or random intervals. The messages may include Get messages and Set messages. The Get messages or messages similar to the Get messages may be used for obtaining information from a system module or a modular device associated with a surgical system. The Set message or messages similar to the Set message may be used for changing a configuration associated with a system module or a modular device associated with a surgical system.

For example, the Get messages or similar messages may include the SNMP messages GetRequest, GetNextRequest, or GetBulkRequest. The Set messages may include SNMP SetRequest message. The GetRequest, GetNextRequest, GetBulkRequest messages or similar messages may be used by a configuration manager (e.g., an SNMP manager) running on the controller 40002. The configuration manager may be in communication with a communication agent (e.g., an SNMP agent) that may be a part of a system module and/or a modular device in a surgical system. The SNMP message SetRequest message or similar may be used by the communication manager on the controller 40002 to set the value of a parameter or an object instance in the communication agent on a system module and/or a modular device of a surgical system. In an example, SNMP modules, for example, may be used to establish communication path between system modules and/or modular devices associated with a surgical system.

Based on the query or configuration related messages received from a management application, such as management applications 40014 and 40016, the controller 40002 may generate configuration queries and/or configuration data for querying or configuring the system modules and/or the modular devices associated with the surgical hub or the surgical system. A surgical hub (e.g., the surgical hub 20006 shown in FIG. 1A) or an edge computing system (e.g., the edge computing system 40064 shown in FIG. 1B) may manage and/or control various system modules and/or modular devices 40012a through 40012n associated with a surgical system. For example, the northbound interface 40004 of the controller 40002 may be used for changing control interactions between one or more modules associated and/or devices associated with a surgical system. In an example, the controller 40002 may be used for establishing one or more communication data paths between a plurality of modules and/or devices associated with a surgical system. The controller 40002 may use its southbound interface 40006 to send the control programs comprising queries and/or configuration changes to the system modules and/or the modular devices of the surgical system.

The system modules and/or the modular devices 40012*a* through 40012*n* of a surgical system, or the communication agents that may be a part of the system modules and/or the modular devices, may send notification messages or traps to the controller 40002. The controller may forward the notification messages or traps via its northbound interface 40004 to the management application 40014 and 40016 for displaying on a display. In an example, the controller 40002 may send the notification to other system modules and/or modular devices 40012*a* through 40012*n* that are part of the surgical system.

The system modules and/or the modular devices 40012*a* through 40012*n* of a surgical system or the communication agents that are part of the system modules and/or the modular devices may send responses to the queries received from the controller 40002. For example, a communication agent that may be part of a system module or a modular device may send a response message in response to a Get or a Set message or messages similar to the Get or the Set messages received from the controller 40002. In an example, in response to a Get message or a similar message received from the controller 40002, the response message from the system module or the modular device 40012*a* through 40012*n* may include the data requested. In an example, in response to a Set message or a similar message received from a system module or a modular device 40012*a* through 40012*n*, the response message from the controller 40002 may include the newly set value as confirmation that the value has been set.

A trap or a notification message or a message similar to the trap or the notification message may be used by a system module or a modular device 40012*a* through 40012*n* to provide information about events associated with the system modules or the modular devices. For example, a trap or a notification message may be sent from a system module or a modular device 40012*a* through 40012*n* to the controller 40002 indicating a status of a communication interface (e.g., whether it available or unavailable for communication). The controller 40002 may send a receipt of the trap message back to the system module or the modular device 40012*a* through 40012*n* (e.g., to the agent on the system module or a modular device).

In an example, TELNET protocol may be used to provide a bidirectional interactive text-oriented communication facility between system modules and/or modular devices 40012*a* through 40012*n* and the controller 40002. TELNET protocol may be used to collect status information and/or send configuration data (e.g., control programs) from/to the controller 40002. TELNET may be used by one of the management applications 40014 or 40016 to establish a connection with the controller 40002 using the transmission control protocol port number 23.

In an example, SSH, a cryptographic encrypted protocol, may be used to allow remote login and to collect status information and/or send configuration data about system modules and/or modular devices 40012*a* through 40012*n* from/to the controller 40002. SSH may be used by one of the management applications 40014 or 40016 to establish an encrypted connection with the controller 40002 using the transmission control protocol port number 22.

In an example, NETCONF may be used to perform management functions by invoking remote procedure calls using, for example, <rpc>, <rpc-reply>, or <edit-config> operations. The <rpc> and <rpc-reply> procedure calls or similar procedure calls may be used for exchanging information from a system module and/or a modular device associated with a surgical system. The NETCONF <edit-config> operation or a similar operation may be used for configuring the system modules and/or the modular devices associated with the surgical system.

The controller 40002 may configure the system modules and/or modular device 40012*a* through 40012*n* to establish a data plane 40010. The data plane 40010 (e.g., also referred to as a user plane or a forwarding plane) may enable a communication data path between a plurality of system modules and/or modular device 40012*a* through 40012*n*. The data plane 40010 may be utilized by the system modules and/or the modular device 40012*a* through 40012*n* for communicating data flows of data between the system modules and/or modular devices associated with a surgical system. The data flows may be established using one or more dedicated communication interfaces between the system modules and/or the modular devices associated with one or more surgical hubs of a surgical system. In an example, the data flows may be established over one or more local area networks (LANs) and one or more wide area networks (WANs), such as the Internet.

In an example, the data plane 40010 may provide support for establishing a first and a second independent, disjointed, concurrent, and redundant communication path for data flow between the system modules and/or modular devices 40012*b* and 40012*n*. As illustrated in FIG. 1C. redundant communication paths may be established between system modules/modular devices 40012*b* and 40012*n*. The redundant communication paths may carry same/redundant data flows between the system modules and/or modular devices. In an example, when or if some of the data packets are dropped on one of the redundant communication paths due to problems with one of the communication interfaces on the system modules/modular devices 40012*b* and 40012*n*, the system modules and/or the modular devices may continue to send/receive at least one copy of the dropped data packets over the second communication path.

Figure 2:
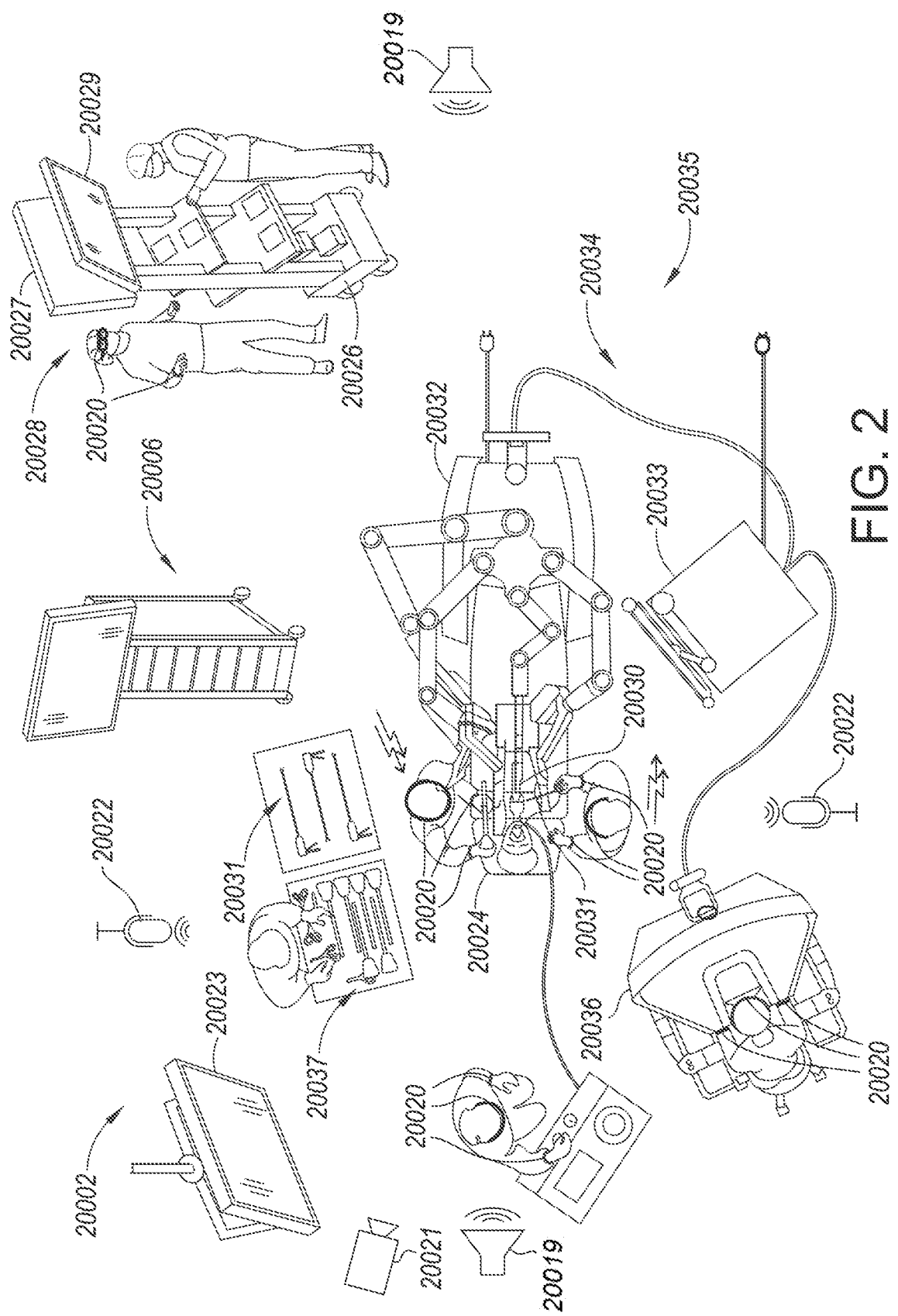
FIG. 2 shows an example surgical system in a surgical operating room.

FIG. 2 shows an example of a surgical system 20002 in a surgical operating room. As illustrated in FIG. 2, a patient is being operated on by one or more health care professionals (HCPs). The HCPs are being monitored by one or more HCP sensing systems 20020 worn by the HCPs. The HCPs and the environment surrounding the HCPs may also be monitored by one or more environmental sensing systems including, for example, a set of cameras 20021, a set of microphones 20022, and other sensors that may be deployed in the operating room. The HCP sensing systems 20020 and the environmental sensing systems may be in communication with a surgical hub 20006, which in turn may be in communication with one or more cloud servers 20009 of the cloud computing system 20008, as shown in FIG. 1A. The environmental sensing systems may be used for measuring one or more environmental attributes, for example, HCP position in the surgical theater, HCP movements, ambient noise in the surgical theater, temperature/humidity in the surgical theater, etc.

As illustrated in FIG. 2, a primary display 20023 and one or more audio output devices (e.g., speakers 20019) are positioned in the sterile field to be visible to an operator at the operating table 20024. In addition, a visualization/notification tower 20026 is positioned outside the sterile field. The visualization/notification tower 20026 may include a first non-sterile human interactive device (HID) 20027 and a second non-sterile HID 20029, which may face away from each other. The HID may be a display or a display with a touchscreen allowing a human to interface directly with the HID. A human interface system, guided by the surgical hub 20006, may be configured to utilize the HIDs 20027, 20029, and 20023 to coordinate information flow to operators inside and outside the sterile field. In an example, the surgical hub 20006 may cause an HID (e.g., the primary HID 20023) to display a notification and/or information about the patient and/or a surgical procedure step. In an example, the surgical hub 20006 may prompt for and/or receive input from personnel in the sterile field or in the non-sterile area. In an example, the surgical hub 20006 may cause an HID to display a snapshot of a surgical site, as recorded by an imaging device 20030, on a non-sterile HID 20027 or 20029, while maintaining a live feed of the surgical site on the primary HID 20023. The snapshot on the non-sterile display 20027 or 20029 can permit a non-sterile operator to perform a diagnostic step relevant to the surgical procedure, for example.

In one aspect, the surgical hub 20006 may be configured to route a diagnostic input or feedback entered by a non-sterile operator at the visualization tower 20026 to the primary display 20023 within the sterile field, where it can be viewed by a sterile operator at the operating table. In one example, the input can be in the form of a modification to the snapshot displayed on the non-sterile display 20027 or 20029, which can be routed to the primary display 20023 by the surgical hub 20006.

Referring to FIG. 2, a surgical instrument 20031 is being used in the surgical procedure as part of the surgical system 20002. The hub 20006 may be configured to coordinate information flow to a display of the surgical instrument 20031. For example, in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety. A diagnostic input or feedback entered by a non-sterile operator at the visualization tower 20026 can be routed by the hub 20006 to the surgical instrument display within the sterile field, where it can be viewed by the operator of the surgical instrument 20031. Example surgical instruments that are suitable for use with the surgical system 20002 are described under the heading "Surgical Instrument Hardware" and in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety, for example.

FIG. 2 illustrates an example of a surgical system 20002 being used to perform a surgical procedure on a patient who is lying down on an operating table 20024 in a surgical operating room 20035. A robotic system 20034 may be used in the surgical procedure as a part of the surgical system 20002. The robotic system 20034 may include a surgeon's console 20036, a patient side cart 20032 (surgical robot), and a surgical robotic hub 20033. The patient side cart 20032 can manipulate at least one removably coupled surgical tool 20037 through a minimally invasive incision in the body of the patient while the surgeon views the surgical site through the surgeon's console 20036. An image of the surgical site can be obtained by a medical imaging device 20030, which can be manipulated by the patient side cart 20032 to orient the imaging device 20030. The robotic hub 20033 can be used to process the images of the surgical site for subsequent display to the surgeon through the surgeon's console 20036.

Other types of robotic systems can be readily adapted for use with the surgical system 20002. Various examples of robotic systems and surgical tools that are suitable for use with the present disclosure are described in U.S. Patent Application Publication No. US 2019-0201137 A1 (U.S. patent application Ser. No. 16/209,407), titled METHOD OF ROBOTIC HUB COMMUNICATION, DETECTION, AND CONTROL, filed Dec. 4, 2018, the disclosure of which is herein incorporated by reference in its entirety.

Various examples of cloud-based analytics that are performed by the cloud computing system 20008, and are suitable for use with the present disclosure, are described in U.S. Patent Application Publication No. US 2019-0206569 A1 (U.S. patent application Ser. No. 16/209,403), titled METHOD OF CLOUD BASED DATA ANALYTICS FOR USE WITH THE HUB, filed Dec. 4, 2018, the disclosure of which is herein incorporated by reference in its entirety.

In various aspects, the imaging device 20030 may include at least one image sensor and one or more optical components. Suitable image sensors may include, but are not limited to, Charge-Coupled Device (CCD) sensors and Complementary Metal-Oxide Semiconductor (CMOS) sensors.

The optical components of the imaging device 20030 may include one or more illumination sources and/or one or more lenses. The one or more illumination sources may be directed to illuminate portions of the surgical field. The one or more image sensors may receive light reflected or refracted from the surgical field, including light reflected or refracted from tissue and/or surgical instruments.

The one or more illumination sources may be configured to radiate electromagnetic energy in the visible spectrum as well as the invisible spectrum. The visible spectrum, sometimes referred to as the optical spectrum or luminous spectrum, is the portion of the electromagnetic spectrum that is visible to (i.e., can be detected by) the human eye and may be referred to as visible light or simply light. A typical human eye will respond to wavelengths in air that range from about 380 nm to about 750 nm.

The invisible spectrum (e.g., the non-luminous spectrum) is the portion of the electromagnetic spectrum that lies below and above the visible spectrum (i.e., wavelengths below about 380 nm and above about 750 nm). The invisible spectrum is not detectable by the human eye. Wavelengths greater than about 750 nm are longer than the red visible spectrum, and they become invisible infrared (IR), microwave, and radio electromagnetic radiation. Wavelengths less than about 380 nm are shorter than the violet spectrum, and they become invisible ultraviolet, x-ray, and gamma ray electromagnetic radiation.

In various aspects, the imaging device 20030 is configured for use in a minimally invasive procedure. Examples of imaging devices suitable for use with the present disclosure include, but are not limited to, an arthroscope, angioscope, bronchoscope, choledochoscope, colonoscope, cytoscope, duodenoscope, enteroscope, esophagogastro-duodenoscope (gastroscope), endoscope, laryngoscope, nasopharyngoneproscope, sigmoidoscope, thoracoscope, and ureteroscope.

The imaging device may employ multi-spectrum monitoring to discriminate topography and underlying structures. A multi-spectral image is one that captures image data within specific wavelength ranges across the electromagnetic spectrum. The wavelengths may be separated by filters or by the use of instruments that are sensitive to particular wavelengths, including light from frequencies beyond the visible light range, e.g., IR and ultraviolet. Spectral imaging can allow extraction of additional information that the human eye fails to capture with its receptors for red, green, and blue. The use of multi-spectral imaging is described in greater detail under the heading "Advanced Imaging Acquisition Module" in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety. Multi-spectrum monitoring can be a useful tool in relocating a surgical field after a surgical task is completed to perform one or more of the previously described tests on the treated tissue. It is axiomatic that strict sterilization of the operating room and surgical equipment is required during any surgery. The strict hygiene and sterilization conditions required in a "surgical theater," i.e., an operating or treatment room, necessitate the highest possible sterility of all medical devices and equipment. Part of that sterilization process is the need to sterilize anything that comes in contact with the patient or penetrates the sterile field, including the imaging device 20030 and its attachments and components. It will be appreciated that the sterile field may be considered a specified area, such as within a tray or on a sterile towel, that is considered free of microorganisms, or the sterile field may be considered an area, immediately around a patient, who has been prepared for a surgical procedure. The sterile field may include the scrubbed team members, who are properly attired, and all furniture and fixtures in the area.

Wearable sensing system 20011 illustrated in FIG. 1A may include one or more sensing systems, for example, HCP sensing systems 20020 as shown in FIG. 2. The HCP sensing systems 20020 may include sensing systems to monitor and detect a set of physical states and/or a set of physiological states of a healthcare personnel (HCP). An HCP may be a surgeon or one or more healthcare personnel assisting the surgeon or other healthcare service providers in general. In an example, a sensing system 20020 may measure a set of biomarkers to monitor the heart rate of an HCP. In an example, a sensing system 20020 worn on a surgeon's wrist (e.g., a watch or a wristband) may use an accelerometer to detect hand motion and/or shakes and determine the magnitude and frequency of tremors. The sensing system 20020 may send the measurement data associated with the set of biomarkers and the data associated with a physical state of the surgeon to the surgical hub 20006 for further processing. One or more environmental sensing devices may send environmental information to the surgical hub 20006. For example, the environmental sensing devices may include a camera 20021 for detecting hand/body position of an HCP. The environmental sensing devices may include microphones 20022 for measuring the ambient noise in the surgical theater. Other environmental sensing devices may include devices, for example, a thermometer to measure temperature and a hygrometer to measure humidity of the surroundings in the surgical theater, etc. The surgical hub 20006, alone or in communication with the cloud computing system, may use the surgeon biomarker measurement data and/or environmental sensing information to modify the control algorithms of hand-held instruments or the averaging delay of a robotic interface, for example, to minimize tremors. In an example, the HCP sensing systems 20020 may measure one or more surgeon biomarkers associated with an HCP and send the measurement data associated with the surgeon biomarkers to the surgical hub 20006. The HCP sensing systems 20020 may use one or more of the following RF protocols for communicating with the surgical hub 20006: Bluetooth, Bluetooth Low-Energy (BLE), Bluetooth Smart, Zigbee, Z-wave, IPv6 Low-power wireless Personal Area Network (6LoWPAN), Wi-Fi. The surgeon biomarkers may include one or more of the following: stress, heart rate, etc. The environmental measurements from the surgical theater may include ambient noise level associated with the surgeon or the patient, surgeon and/or staff movements, surgeon and/or staff attention level, etc.

The surgical hub 20006 may use the surgeon biomarker measurement data associated with an HCP to adaptively control one or more surgical instruments 20031. For example, the surgical hub 20006 may send a control program to a surgical instrument 20031 to control its actuators to limit or compensate for fatigue and use of fine motor skills. The surgical hub 20006 may send the control program based on situational awareness and/or the context on importance or criticality of a task. The control program may instruct the instrument to alter operation to provide more control when control is needed.

Figure 3:
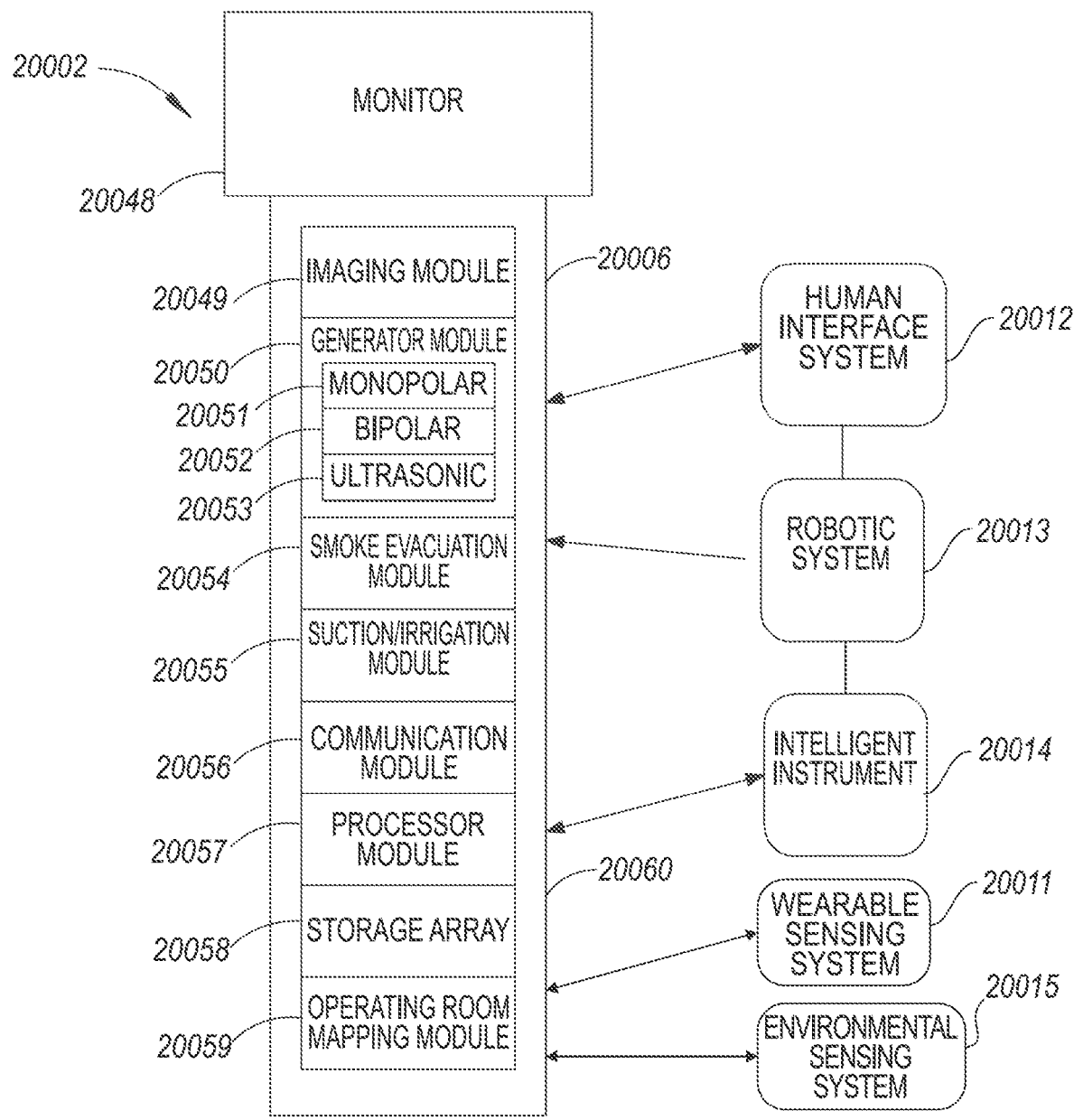
FIG. 3 illustrates an example surgical hub paired with various systems.

FIG. 3 shows an example surgical system 20002 with a surgical hub 20006 paired with a wearable sensing system 20011, an environmental sensing system 20015, a human interface system 20012, a robotic system 20013, and an intelligent instrument 20014. The hub 20006 includes a display 20048, an imaging module 20049, a generator module 20050, a communication module 20056, a processor module 20057, a storage array 20058, and an operating-room mapping module 20059. In certain aspects, as illustrated in FIG. 3, the hub 20006 further includes a smoke evacuation module 20054 and/or a suction/irrigation module 20055. During a surgical procedure, energy application to tissue, for sealing and/or cutting, is generally associated with smoke evacuation, suction of excess fluid, and/or irrigation of the tissue. Fluid, power, and/or data lines from different sources are often entangled during the surgical procedure. Valuable time can be lost addressing this issue during a surgical procedure. Detangling the lines may necessitate disconnecting the lines from their respective modules, which may require resetting the modules. The hub modular enclosure 20060 offers a unified environment for managing the power, data, and fluid lines, which reduces the frequency of entanglement between such lines. Aspects of the present disclosure present a surgical hub 20006 for use in a surgical procedure that involves energy application to tissue at a surgical site. The surgical hub 20006 includes a hub enclosure 20060 and a combo generator module slidably receivable in a docking station of the hub enclosure 20060. The docking station includes data and power contacts. The combo generator module includes two or more of an ultrasonic energy generator component, a bipolar RF energy generator component, and a monopolar RF energy generator component that are housed in a single unit. In one aspect, the combo generator module also includes a smoke evacuation component, at least one energy delivery cable for connecting the combo generator module to a surgical instrument, at least one smoke evacuation component configured to evacuate smoke, fluid, and/or particulates generated by the application of therapeutic energy to the tissue, and a fluid line extending from the remote surgical site to the smoke evacuation component. In one aspect, the fluid line may be a first fluid line, and a second fluid line may extend from the remote surgical site to a suction and irrigation module 20055 slidably received in the hub enclosure 20060. In one aspect, the hub enclosure 20060 may include a fluid interface.

Certain surgical procedures may require the application of more than one energy type to the tissue. One energy type may be more beneficial for cutting the tissue, while another different energy type may be more beneficial for sealing the tissue. For example, a bipolar generator can be used to seal the tissue while an ultrasonic generator can be used to cut the sealed tissue. Aspects of the present disclosure present a solution where a hub modular enclosure 20060 is configured to accommodate different generators and facilitate an interactive communication therebetween. One of the advantages of the hub modular enclosure 20060 is enabling the quick removal and/or replacement of various modules. Aspects of the present disclosure present a modular surgical enclosure for use in a surgical procedure that involves energy application to tissue. The modular surgical enclosure includes a first energy-generator module, configured to generate a first energy for application to the tissue, and a first docking station comprising a first docking port that includes first data and power contacts, wherein the first energy-generator module is slidably movable into an electrical engagement with the power and data contacts and wherein the first energy-generator module is slidably movable out of the electrical engagement with the first power and data contacts. Further to the above, the modular surgical enclosure also includes a second energy-generator module configured to generate a second energy, different than the first energy, for application to the tissue, and a second docking station comprising a second docking port that includes second data and power contacts, wherein the second energy generator module is slidably movable into an electrical engagement with the power and data contacts, and wherein the second energy-generator module is slidably movable out of the electrical engagement with the second power and data contacts. In addition, the modular surgical enclosure also includes a communication bus between the first docking port and the second docking port, configured to facilitate communication between the first energy-generator module and the second energy-generator module. Referring to FIG. 3, aspects of the present disclosure are presented for a hub modular enclosure 20060 that allows the modular integration of a generator module 20050, a smoke evacuation module 20054, and a suction/irrigation module 20055. The hub modular enclosure 20060 further facilitates interactive communication between the modules 20059, 20054, and 20055. The generator module 20050 can be with integrated monopolar, bipolar, and ultrasonic components supported in a single housing unit slidably insertable into the hub modular enclosure 20060. The generator module 20050 can be configured to connect to a monopolar device 20051, a bipolar device 20052, and an ultrasonic device 20053. Alternatively, the generator module 20050 may comprise a series of monopolar, bipolar, and/or ultrasonic generator modules that interact through the hub modular enclosure 20060. The hub modular enclosure 20060 can be configured to facilitate the insertion of multiple generators and interactive communication between the generators docked into the hub modular enclosure 20060 so that the generators would act as a single generator.

Figure 4:
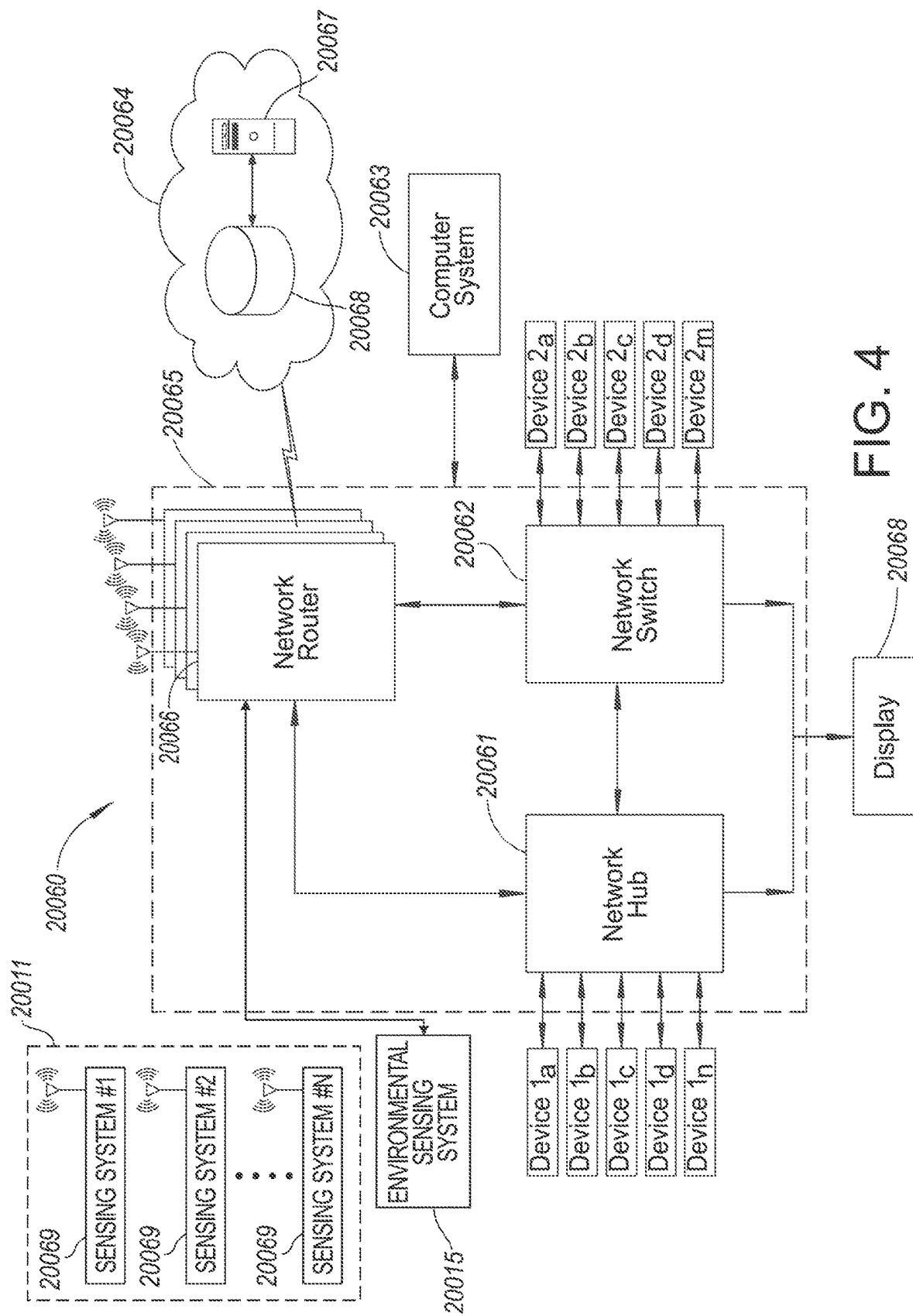
FIG. 4 illustrates a surgical data network having a set of communication surgical hubs configured to connect with a set of sensing systems, an environmental sensing system, a set of devices, etc.

FIG. 4 illustrates a surgical data network having a set of communication hubs configured to connect a set of sensing systems, environment sensing system(s), and a set of other modular devices located in one or more operating theaters of a healthcare facility, a patient recovery room, or a room in a healthcare facility specially equipped for surgical operations, to the cloud, in accordance with at least one aspect of the present disclosure.

As illustrated in FIG. 4, a surgical hub system 20060 may include a modular communication hub 20065 that is configured to connect modular devices located in a healthcare facility to a cloud-based system (e.g., a cloud computing system 20064 that may include a remote server 20067 coupled to a remote storage 20068). The modular communication hub 20065 and the devices may be connected in a room in a healthcare facility specially equipped for surgical operations. In one aspect, the modular communication hub 20065 may include a network hub 20061 and/or a network switch 20062 in communication with a network router 20066. The modular communication hub 20065 may be coupled to a local computer system 20063 to provide local computer processing and data manipulation.

The computer system 20063 may comprise a processor and a network interface 20100. The processor may be coupled to a communication module, storage, memory, non-volatile memory, and input/output (I/O) interface via a system bus. The system bus can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Charmel Architecture (MSA), Extended ISA (EISA), Intelligent Drive Electronics (IDE), VESA Local Bus (VLB), Peripheral Component Interconnect (PCI), USB, Advanced Graphics Port (AGP), Personal Computer Memory Card International Association bus (PCMCIA), Small Computer Systems Interface (SCSI), or any other proprietary bus.

The processor may be any single-core or multicore processor such as those known under the trade name ARM Cortex by Texas Instruments. In one aspect, the processor may be an LM4F230H5QR ARM Cortex-M4F Processor Core, available from Texas Instruments, for example, comprising an on-chip memory of 256 KB single-cycle flash memory, or other non-volatile memory, up to 40 MHz, a prefetch buffer to improve performance above 40 MHz, a 32 KB single-cycle serial random access memory (SRAM), an internal read-only memory (ROM) loaded with Stellaris Ware® software, a 2 KB electrically erasable programmable read-only memory (EEPROM), and/or one or more pulse width modulation (PWM) modules, one or more quadrature encoder inputs (QEI) analogs, one or more 12-bit analog-to-digital converters (ADCs) with 12 analog input channels, details of which are available for the product datasheet.

In an example, the processor may comprise a safety controller comprising two controller-based families such as TMS570 and RM4x, known under the trade name Hercules ARM Cortex R4, also by Texas Instruments. The safety controller may be configured specifically for IEC 61508 and ISO 26262 safety critical applications, among others, to provide advanced integrated safety features while delivering scalable performance, connectivity, and memory options.

It is to be appreciated that the computer system 20063 may include software that acts as an intermediary between users and the basic computer resources described in a suitable operating environment. Such software may include an operating system. The operating system, which can be stored on the disk storage, may act to control and allocate resources of the computer system. System applications may take advantage of the management of resources by the operating system through program modules and program data stored either in the system memory or on the disk storage. It is to be appreciated that various components described herein can be implemented with various operating systems or combinations of operating systems.

A user may enter commands or information into the computer system 20063 through input device(s) coupled to the I/O interface. The input devices may include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processor 20102 through the system bus via interface port(s). The interface port(s) include, for example, a serial port, a parallel port, a game port, and a USB. The output device(s) use some of the same types of ports as input device(s). Thus, for example, a USB port may be used to provide input to the computer system 20063 and to output information from the computer system 20063 to an output device. An output adapter may be provided to illustrate that there can be some output devices like monitors, displays, speakers, and printers, among other output devices that may require special adapters. The output adapters may include, by way of illustration and not limitation, video and sound cards that provide a means of connection between the output device and the system bus. It should be noted that other devices and/or systems of devices, such as remote computer(s), may provide both input and output capabilities.

The computer system 20063 can operate in a networked environment using logical connections to one or more remote computers, such as cloud computer(s), or local computers. The remote cloud computer(s) can be a personal computer, server, router, network PC, workstation, microprocessor-based appliance, peer device, or other common network node, and the like, and typically includes many or all of the elements described relative to the computer system. For purposes of brevity, only a memory storage device is illustrated with the remote computer(s). The remote computer(s) may be logically connected to the computer system through a network interface and then physically connected via a communication connection. The network interface may encompass communication networks such as local area networks (LANs) and wide area networks (WANs). LAN technologies may include Fiber Distributed Data Interface (FDDI), Copper Distributed Data Interface (CDDI), Ethernet/IEEE 802.3, Token Ring/IEEE 802.5, and the like. WAN technologies may include, but are not limited to, point-to-point links, circuit-switching networks like Integrated Services Digital Networks (ISDN) and variations thereon, packet-switching networks, and Digital Subscriber Lines (DSL).

In various examples, the computer system 20063 may comprise an image processor, image-processing engine, media processor, or any specialized digital signal processor (DSP) used for the processing of digital images. The image processor may employ parallel computing with single instruction, multiple data (SIMD) or multiple instruction, multiple data (MIMD) technologies to increase speed and efficiency. The digital image-processing engine can perform a range of tasks. The image processor may be a system on a chip with multicore processor architecture.

The communication connection(s) may refer to the hardware/software employed to connect the network interface to the bus. While the communication connection is shown for illustrative clarity inside the computer system 20063, it can also be external to the computer system 20063. The hardware/software necessary for connection to the network interface may include, for illustrative purposes only, internal and external technologies such as modems, including regular telephone-grade modems, cable modems, optical fiber modems, and DSL modems, ISDN adapters, and Ethernet cards. In some examples, the network interface may also be provided using an RF interface.

Surgical data network associated with the surgical hub system 20060 may be configured as passive, intelligent, or switching. A passive surgical data network serves as a conduit for the data, enabling it to go from one device (or segment) to another and to the cloud computing resources. An intelligent surgical data network includes additional features to enable the traffic passing through the surgical data network to be monitored and to configure each port in the network hub 20061 or network switch 20062. An intelligent surgical data network may be referred to as a manageable hub or switch. A switching hub reads the destination address of each packet and then forwards the packet to the correct port.

Modular devices 1a-1n located in the operating theater may be coupled to the modular communication hub 20065. The network hub 20061 and/or the network switch 20062 may be coupled to a network router 20066 to connect the devices 1a-1n to the cloud computing system 20064 or the local computer system 20063. Data associated with the devices 1a-1n may be transferred to cloud-based computers via the router for remote data processing and manipulation. Data associated with the devices 1a-1n may also be transferred to the local computer system 20063 for local data processing and manipulation. Modular devices 2a-2m located in the same operating theater also may be coupled to a network switch 20062. The network switch 20062 may be coupled to the network hub 20061 and/or the network router 20066 to connect the devices 2a-2m to the cloud 20064. Data associated with the devices 2a-2m may be transferred to the cloud computing system 20064 via the network router 20066 for data processing and manipulation. Data associated with the devices 2a-2m may also be transferred to the local computer system 20063 for local data processing and manipulation.

The wearable sensing system 20011 may include one or more sensing systems 20069. The sensing systems 20069 may include an HCP sensing system and/or a patient sensing system. The one or more sensing systems 20069 may be in communication with the computer system 20063 of a surgical hub system 20060 or the cloud server 20067 directly via one of the network routers 20066 or via a network hub 20061 or network switching 20062 that is in communication with the network routers 20066.

The sensing systems 20069 may be coupled to the network router 20066 to connect to the sensing systems 20069 to the local computer system 20063 and/or the cloud computing system 20064. Data associated with the sensing systems 20069 may be transferred to the cloud computing system 20064 via the network router 20066 for data processing and manipulation. Data associated with the sensing systems 20069 may also be transferred to the local computer system 20063 for local data processing and manipulation.

As illustrated in FIG. 4, the surgical hub system 20060 may be expanded by interconnecting multiple network hubs 20061 and/or multiple network switches 20062 with multiple network routers 20066. The modular communication hub 20065 may be contained in a modular control tower configured to receive multiple devices 1a-1n/2a-2m. The local computer system 20063 also may be contained in a modular control tower. The modular communication hub 20065 may be connected to a display 20068 to display images obtained by some of the devices 1a-1n/2a-2m, for example during surgical procedures. In various aspects, the devices 1a-1n/2a-2m may include, for example, various modules such as an imaging module coupled to an endoscope, a generator module coupled to an energy-based surgical device, a smoke evacuation module, a suction/irrigation module, a communication module, a processor module, a storage array, a surgical device coupled to a display, and/or a non-contact sensor module, among other modular devices that may be connected to the modular communication hub 20065 of the surgical data network.

In one aspect, the surgical hub system 20060 illustrated in FIG. 4 may comprise a combination of network hub(s), network switch(es), and network router(s) connecting the devices 1a-1n/2a-2m or the sensing systems 20069 to the cloud-base system 20064. One or more of the devices 1a-1n/2a-2m or the sensing systems 20069 coupled to the network hub 20061 or network switch 20062 may collect data in real-time and transfer the data to cloud computers for data processing and manipulation. It will be appreciated that cloud computing relies on sharing computing resources rather than having local servers or personal devices to handle software applications. The word "cloud" may be used as a metaphor for "the Internet," although the term is not limited as such. Accordingly, the term "cloud computing" may be used herein to refer to "a type of Internet-based computing," where different services-such as servers, storage, and applications—are delivered to the modular communication hub 20065 and/or computer system 20063 located in the surgical theater (e.g., a fixed, mobile, temporary, or field operating room or space) and to devices connected to the modular communication hub 20065 and/or computer system 20063 through the Internet. The cloud infrastructure may be maintained by a cloud service provider. In this context, the cloud service provider may be the entity that coordinates the usage and control of the devices 1a-1n/2a-2m located in one or more operating theaters. The cloud computing services can perform a large number of calculations based on the data gathered by smart surgical instruments, robots, sensing systems, and other computerized devices located in the operating theater. The hub hardware enables multiple devices, sensing systems, and/or connections to be connected to a computer that communicates with the cloud computing resources and storage.

Applying cloud computer data processing techniques on the data collected by the devices 1a-1n/2a-2m, the surgical data network can provide improved surgical outcomes, reduced costs, and improved patient satisfaction. At least some of the devices 1a-1n/2a-2m may be employed to view tissue states to assess leaks or perfusion of sealed tissue after a tissue sealing and cutting procedure. At least some of the devices 1a-1n/2a-2m may be employed to identify pathology, such as the effects of diseases, using the cloud-based computing to examine data including images of samples of body tissue for diagnostic purposes. This may include localization and margin confirmation of tissue and phenotypes. At least some of the devices 1a-1n/2a-2m may be employed to identify anatomical structures of the body using a variety of sensors integrated with imaging devices and techniques such as overlaying images captured by multiple imaging devices. The data gathered by the devices 1a-1n/2a-2m, including image data, may be transferred to the cloud computing system 20064 or the local computer system 20063 or both for data processing and manipulation including image processing and manipulation. The data may be analyzed to improve surgical procedure outcomes by determining if further treatment, such as the application of endoscopic intervention, emerging technologies, a targeted radiation, targeted intervention, and precise robotics to tissue-specific sites and conditions, may be pursued. Such data analysis may further employ outcome analytics processing and using standardized approaches may provide beneficial feedback to either confirm surgical treatments and the behavior of the surgeon or suggest modifications to surgical treatments and the behavior of the surgeon.

Applying cloud computer data processing techniques on the measurement data collected by the sensing systems 20069, the surgical data network can provide improved surgical outcomes, improved recovery outcomes, reduced costs, and improved patient satisfaction. At least some of the sensing systems 20069 may be employed to assess physiological conditions of a surgeon operating on a patient or a patient being prepared for a surgical procedure or a patient recovering after a surgical procedure. The cloud-based computing system 20064 may be used to monitor biomarkers associated with a surgeon or a patient in real-time and to generate surgical plans based at least on measurement data gathered prior to a surgical procedure, provide control signals to the surgical instruments during a surgical procedure, and notify a patient of a complication during post-surgical period.

The operating theater devices 1a-1n may be connected to the modular communication hub 20065 over a wired channel or a wireless channel depending on the configuration of the devices 1a-1n to a network hub 20061. The network hub 20061 may be implemented, in one aspect, as a local network broadcast device that works on the physical layer of the Open System Interconnection (OSI) model. The network hub may provide connectivity to the devices 1a-1n located in the same operating theater network. The network hub 20061 may collect data in the form of packets and sends them to the router in half duplex mode. The network hub 20061 may not store any media access control/Internet Protocol (MAC/IP) to transfer the device data. Only one of the devices 1a-1n can send data at a time through the network hub 20061. The network hub 20061 may not have routing tables or intelligence regarding where to send information and broadcasts all network data across each connection and to a remote server 20067 of the cloud computing system 20064. The network hub 20061 can detect basic network errors such as collisions but having all information broadcast to multiple ports can be a security risk and cause bottlenecks.

The operating theater devices 2a-2m may be connected to a network switch 20062 over a wired channel or a wireless channel. The network switch 20062 works in the data link layer of the OSI model. The network switch 20062 may be a multicast device for connecting the devices 2a-2m located in the same operating theater to the network. The network switch 20062 may send data in the form of frames to the network router 20066 and may work in full duplex mode. Multiple devices 2a-2m can send data at the same time through the network switch 20062. The network switch 20062 stores and uses MAC addresses of the devices 2a-2m to transfer data.

The network hub 20061 and/or the network switch 20062 may be coupled to the network router 20066 for connection to the cloud computing system 20064. The network router 20066 works in the network layer of the OSI model. The network router 20066 creates a route for transmitting data packets received from the network hub 20061 and/or network switch 20062 to cloud-based computer resources for further processing and manipulation of the data collected by any one of or all the devices 1a-1n/2a-2m and wearable sensing system 20011. The network router 20066 may be employed to connect two or more different networks located in different locations, such as, for example, different operating theaters of the same healthcare facility or different networks located in different operating theaters of different healthcare facilities. The network router 20066 may send data in the form of packets to the cloud computing system 20064 and works in full duplex mode. Multiple devices can send data at the same time. The network router 20066 may use IP addresses to transfer data.

In an example, the network hub 20061 may be implemented as a USB hub, which allows multiple USB devices to be connected to a host computer. The USB hub may expand a single USB port into several tiers so that there are more ports available to connect devices to the host system computer. The network hub 20061 may include wired or wireless capabilities to receive information over a wired channel or a wireless channel. In one aspect, a wireless USB short-range, high-bandwidth wireless radio communication protocol may be employed for communication between the devices 1a-1n and devices 2a-2m located in the operating theater.

In examples, the operating theater devices 1a-1n/2a-2m and/or the sensing systems 20069 may communicate to the modular communication hub 20065 via Bluetooth wireless technology standard for exchanging data over short distances (using short-wavelength UHF radio waves in the ISM band from 2.4 to 2.485 GHz) from fixed and mobile devices and building personal area networks (PANs). The operating theater devices 1a-1n/2a-2m and/or the sensing systems 20069 may communicate to the modular communication hub 20065 via a number of wireless or wired communication standards or protocols, including but not limited to Bluetooth, Low-Energy Bluetooth, near-field communication (NFC), Wi-Fi (IEEE 802.11 family), WiMAX (IEEE 802.16 family), IEEE 802.20, new radio (NR), long-term evolution (LTE), and Ev-DO, HSPA+, HSDPA+, HSUPA+, EDGE, GSM, GPRS, CDMA, TDMA, DECT, and Ethernet derivatives thereof, as well as any other wireless and wired protocols that are designated as 3G, 4G, 5G, and beyond. The computing module may include a plurality of communication modules. For instance, a first communication module may be dedicated to shorter-range wireless communications such as Wi-Fi and Bluetooth Low-Energy Bluetooth, Bluetooth Smart, and a second communication module may be dedicated to longer-range wireless communications such as GPS, EDGE, GPRS, CDMA, WiMAX, LTE, Ev-DO, HSPA+, HSDPA+, HSUPA+, EDGE, GSM, GPRS, CDMA, TDMA, and others.

The modular communication hub 20065 may serve as a central connection for one or more of the operating theater devices 1a-1n/2a-2m and/or the sensing systems 20069 and may handle a data type known as frames. Frames may carry the data generated by the devices 1a-1n/2a-2m and/or the sensing systems 20069. When a frame is received by the modular communication hub 20065, it may be amplified and/or sent to the network router 20066, which may transfer the data to the cloud computing system 20064 or the local computer system 20063 by using a number of wireless or wired communication standards or protocols, as described herein.

The modular communication hub 20065 can be used as a standalone device or be connected to compatible network hubs 20061 and network switches 20062 to form a larger network. The modular communication hub 20065 can be generally easy to install, configure, and maintain, making it a good option for networking the operating theater devices 1a-1n/2a-2m.

Figure 5:
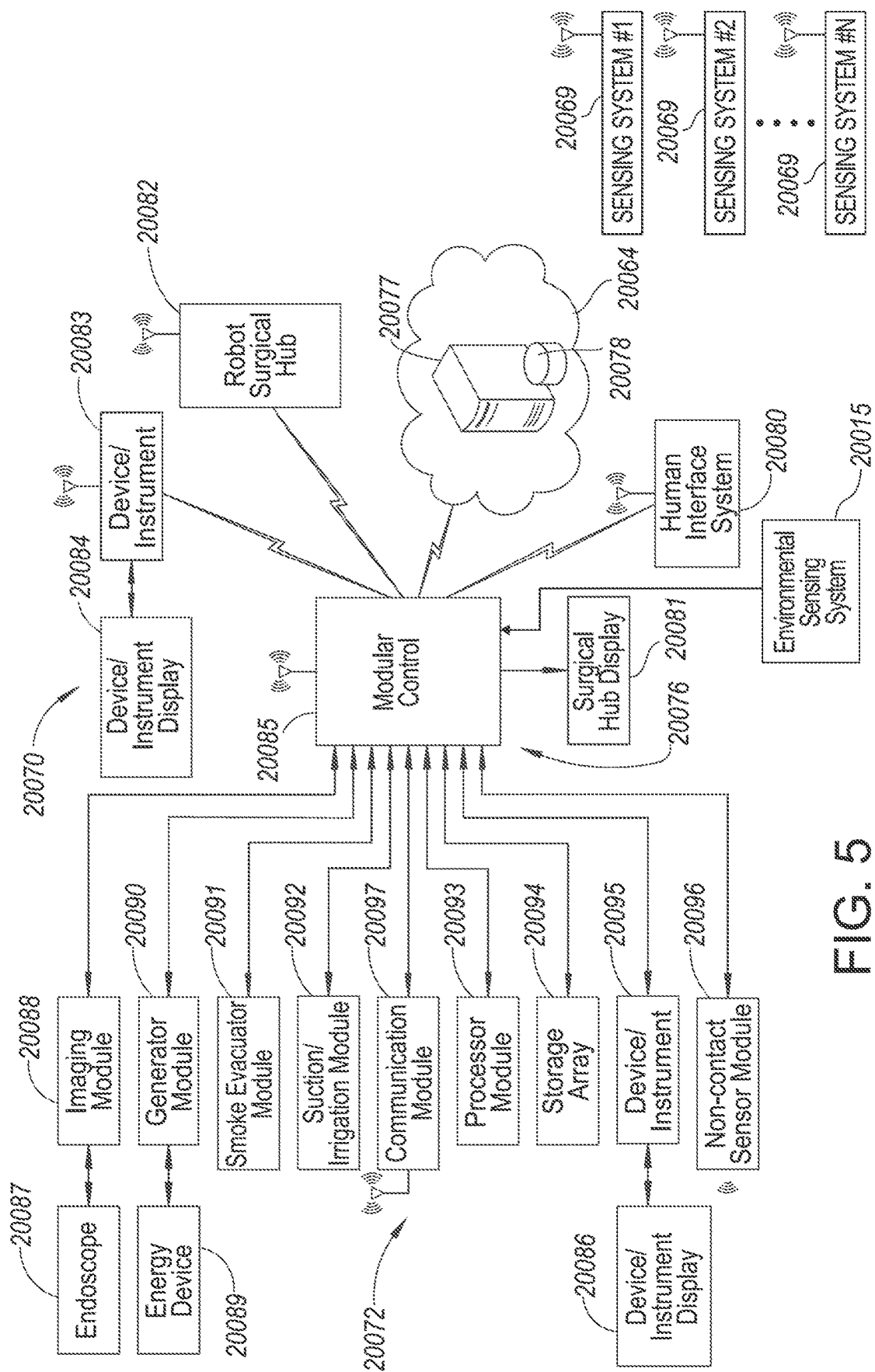
FIG. 5 illustrates an example computer-implemented interactive surgical system that may be part of a surgical system.

FIG. 5 illustrates a computer-implemented interactive surgical system 20070 that may be a part of the Surgical system 20002. The computer-implemented interactive surgical system 20070 is similar in many respects to the HCP sensing system 20002. For example, the computer-implemented interactive surgical system 20070 may include one or more surgical sub-systems 20072, which are similar in many respects to the Surgical systems 20002. Each sub-surgical system 20072 may include at least one surgical hub 20076 in communication with a cloud computing system 20064 that may include a remote server 20077 and a remote storage 20078. In one aspect, the computer-implemented interactive surgical system 20070 may include a modular control 20085 connected to multiple operating theater devices such as sensing systems 20001, intelligent surgical instruments, robots, and other computerized devices located in the operating theater.

As illustrated in the example of FIG. 5, the modular control 20085 may be coupled to an imaging module 20088 that may be coupled to an endoscope 20087, a generator module 20090 that may be coupled to an energy device 20089, a smoke evacuator module 20091, a suction/irrigation module 20092, a communication module 20097, a processor module 20093, a storage array 20094, a smart device/instrument 20095 optionally coupled to a display 20086 and 20084 respectively, and a non-contact sensor module 20096. The non-contact sensor module 20096 may measure the dimensions of the operating theater and generate a map of the surgical theater using, ultrasonic, laser-type, and/or the like, non-contact measurement devices. Other distance sensors can be employed to determine the bounds of an operating room. An ultrasound-based non-contact sensor module may scan the operating theater by transmitting a burst of ultrasound and receiving the echo when it bounces off the perimeter walls of an operating theater as described under the heading "Surgical Hub Spatial Awareness Within an Operating Room" in U.S. Provisional Patent Application Ser. No. 62/611,341, titled INTERACTIVE SURGICAL PLATFORM, filed Dec. 28, 2017, which is herein incorporated by reference in its entirety. The sensor module may be configured to determine the size of the operating theater and to adjust Bluetooth-pairing distance limits. A laser-based non-contact sensor module may scan the operating theater by transmitting laser light pulses, receiving laser light pulses that bounce off the perimeter walls of the operating theater, and comparing the phase of the transmitted pulse to the received pulse to determine the size of the operating theater and to adjust Bluetooth pairing distance limits, for example.

The modular control 20085 may also be in communication with one or more sensing systems 20069 and an environmental sensing system 20015. The sensing systems 20069 may be connected to the modular control 20085 either directly via a router or via the communication module 20097. The operating theater devices may be coupled to cloud computing resources and data storage via the modular control 20085. A robot surgical hub 20082 also may be connected to the modular control 20085 and to the cloud computing resources. The devices/instruments 20095 or 20084, human interface system 20080, among others, may be coupled to the modular control 20085 via wired or wireless communication standards or protocols, as described herein. The human interface system 20080 may include a display sub-system and a notification sub-system. The modular control 20085 may be coupled to a hub display 20081 (e.g., monitor, screen) to display and overlay images received from the imaging module 20088, device/instrument display 20086, and/or other human interface systems 20080. The hub display 20081 also may display data received from devices connected to the modular control 20085 in conjunction with images and overlaid images.

Figure 6:
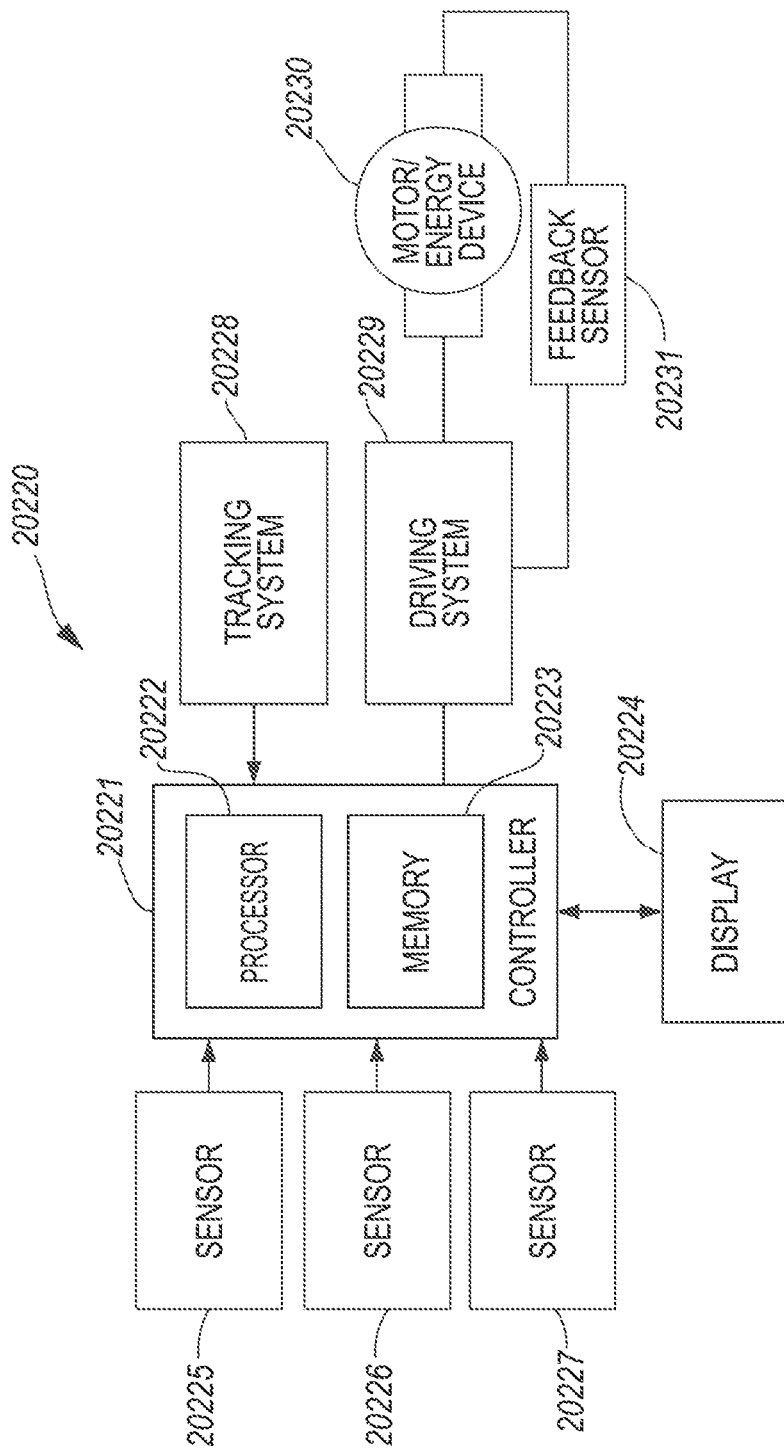
FIG. 6 illustrates a logic diagram of a control system of a surgical instrument.

FIG. 6 illustrates a logical diagram of a control system 20220 of a surgical instrument or a surgical tool in accordance with one or more aspects of the present disclosure. The surgical instrument or the surgical tool may be configurable. The surgical instrument may include surgical fixtures specific to the procedure at-hand, such as imaging devices, surgical staplers, energy devices, endocutter devices, or the like. For example, the surgical instrument may include any of a powered stapler, a powered stapler generator, an energy device, an advanced energy device, an advanced energy jaw device, an endocutter clamp, an energy device generator, an in-operating-room imaging system, a smoke evacuator, a suction-irrigation device, an insufflation system, or the like. The system 20220 may comprise a control circuit. The control circuit may include a microcontroller 20221 comprising a processor 20222 and a memory 20223. One or more of sensors 20225, 20226, 20227, for example, provide real-time feedback to the processor 20222. A motor 20230, driven by a motor driver 20229, operably couples a longitudinally movable displacement member to drive the I-beam knife element. A tracking system 20228 may be configured to determine the position of the longitudinally movable displacement member. The position information may be provided to the processor 20222, which can be programmed or configured to determine the position of the longitudinally movable drive member as well as the position of a firing member, firing bar, and I-beam knife element. Additional motors may be provided at the tool driver interface to control I-beam firing, closure tube travel, shaft rotation, and articulation. A display 20224 may display a variety of operating conditions of the instruments and may include touch screen functionality for data input. Information displayed on the display 20224 may be overlaid with images acquired via endoscopic imaging modules.

The microcontroller 20221 may be any single-core or multicore processor such as those known under the trade name ARM Cortex by Texas Instruments. In one aspect, the main microcontroller 20221 may be an LM4F230H5QR ARM Cortex-M4F Processor Core, available from Texas Instruments, for example, comprising an on-chip memory of 256 KB single-cycle flash memory, or other non-volatile memory, up to 40 MHz, a prefetch buffer to improve performance above 40 MHz, a 32 KB single-cycle SRAM, and internal ROM loaded with Stellaris Ware® software, a 2 KB EEPROM, one or more PWM modules, one or more QEI analogs, and/or one or more 12-bit ADCs with 12 analog input channels, details of which are available for the product datasheet.

The microcontroller 20221 may comprise a safety controller comprising two controller-based families such as TMS570 and RM4x, known under the trade name Hercules ARM Cortex R4, also by Texas Instruments. The safety controller may be configured specifically for IEC 61508 and ISO 26262 safety critical applications, among others, to provide advanced integrated safety features while delivering scalable performance, connectivity, and memory options.

The microcontroller 20221 may be programmed to perform various functions such as precise control over the speed and position of the knife and articulation systems. In one aspect, the microcontroller 20221 may include a processor 20222 and a memory 20223. The electric motor 20230 may be a brushed direct current (DC) motor with a gearbox and mechanical links to an articulation or knife system. In one aspect, a motor driver 20229 may be an A3941 available from Allegro Microsystems, Inc. Other motor drivers may be readily substituted for use in the tracking system 20228 comprising an absolute positioning system. A detailed description of an absolute positioning system is described in U.S. Patent Application Publication No. 2017/0296213, titled SYSTEMS AND METHODS FOR CONTROLLING A SURGICAL STAPLING AND CUTTING INSTRUMENT, which published on Oct. 19, 2017, which is herein incorporated by reference in its entirety.

The microcontroller 20221 may be programmed to provide precise control over the speed and position of displacement members and articulation systems. The microcontroller 20221 may be configured to compute a response in the software of the microcontroller 20221. The computed response may be compared to a measured response of the actual system to obtain an "observed" response, which is used for actual feedback decisions. The observed response may be a favorable, tuned value that balances the smooth, continuous nature of the simulated response with the measured response, which can detect outside influences on the system.

The motor 20230 may be controlled by the motor driver 20229 and can be employed by the firing system of the surgical instrument or tool. In various forms, the motor 20230 may be a brushed DC driving motor having a maximum rotational speed of approximately 25,000 RPM. In some examples, the motor 20230 may include a brushless motor, a cordless motor, a synchronous motor, a stepper motor, or any other suitable electric motor. The motor driver 20229 may comprise an H-bridge driver comprising field-effect transistors (FETs), for example. The motor 20230 can be powered by a power assembly releasably mounted to the handle assembly or tool housing for supplying control power to the surgical instrument or tool. The power assembly may comprise a battery which may include a number of battery cells connected in series that can be used as the power source to power the surgical instrument or tool. In certain circumstances, the battery cells of the power assembly may be replaceable and/or rechargeable. In at least one example, the battery cells can be lithium-ion batteries which can be couplable to and separable from the power assembly.

The motor driver 20229 may be an A3941 available from Allegro Microsystems, Inc. A3941 may be a full-bridge controller for use with external N-channel power metal-oxide semiconductor field-effect transistors (MOSFETs) specifically designed for inductive loads, such as brush DC motors. The driver 20229 may comprise a unique charge pump regulator that can provide full (>10 V) gate drive for battery voltages down to 7 V and can allow the A3941 to operate with a reduced gate drive, down to 5.5 V. A bootstrap capacitor may be employed to provide the above battery supply voltage required for N-channel MOSFETs. An internal charge pump for the high-side drive may allow DC (100% duty cycle) operation. The full bridge can be driven in fast or slow decay modes using diode or synchronous rectification. In the slow decay mode, current recirculation can be through the high-side or the low-side FETs. The power FETs may be protected from shoot-through by resistor-adjustable dead time. Integrated diagnostics provide indications of undervoltage, overtemperature, and power bridge faults and can be configured to protect the power MOSFETs under most short circuit conditions. Other motor drivers may be readily substituted for use in the tracking system 20228 comprising an absolute positioning system.

The tracking system 20228 may comprise a controlled motor drive circuit arrangement comprising a position sensor 20225 according to one aspect of this disclosure. The position sensor 20225 for an absolute positioning system may provide a unique position signal corresponding to the location of a displacement member. In some examples, the displacement member may represent a longitudinally movable drive member comprising a rack of drive teeth for meshing engagement with a corresponding drive gear of a gear reducer assembly. In some examples, the displacement member may represent the firing member, which could be adapted and configured to include a rack of drive teeth. In some examples, the displacement member may represent a firing bar or the I-beam, each of which can be adapted and configured to include a rack of drive teeth. Accordingly, as used herein, the term displacement member can be used generically to refer to any movable member of the surgical instrument or tool such as the drive member, the firing member, the firing bar, the I-beam, or any element that can be displaced. In one aspect, the longitudinally movable drive member can be coupled to the firing member, the firing bar, and the I-beam. Accordingly, the absolute positioning system can, in effect, track the linear displacement of the I-beam by tracking the linear displacement of the longitudinally movable drive member. In various aspects, the displacement member may be coupled to any position sensor 20225 suitable for measuring linear displacement. Thus, the longitudinally movable drive member, the firing member, the firing bar, or the I-beam, or combinations thereof, may be coupled to any suitable linear displacement sensor. Linear displacement sensors may include contact or non-contact displacement sensors. Linear displacement sensors may comprise linear variable differential transformers (LVDT), differential variable reluctance transducers (DVRT), a slide potentiometer, a magnetic sensing system comprising a movable magnet and a series of linearly arranged Hall effect sensors, a magnetic sensing system comprising a fixed magnet and a series of movable, linearly arranged Hall effect sensors, an optical sensing system comprising a movable light source and a series of linearly arranged photo diodes or photo detectors, an optical sensing system comprising a fixed light source and a series of movable linearly, arranged photodiodes or photodetectors, or any combination thereof.

The electric motor 20230 can include a rotatable shaft that operably interfaces with a gear assembly that is mounted in meshing engagement with a set, or rack, of drive teeth on the displacement member. A sensor element may be operably coupled to a gear assembly such that a single revolution of the position sensor 20225 element corresponds to some linear longitudinal translation of the displacement member. An arrangement of gearing and sensors can be connected to the linear actuator, via a rack and pinion arrangement, or a rotary actuator, via a spur gear or other connection. A power source may supply power to the absolute positioning system and an output indicator may display the output of the absolute positioning system. The displacement member may represent the longitudinally movable drive member comprising a rack of drive teeth formed thereon for meshing engagement with a corresponding drive gear of the gear reducer assembly. The displacement member may represent the longitudinally movable firing member, firing bar, I-beam, or combinations thereof.

A single revolution of the sensor element associated with the position sensor 20225 may be equivalent to a longitudinal linear displacement d1 of the displacement member, where d1 is the longitudinal linear distance that the displacement member moves from point "a" to point "b" after a single revolution of the sensor element coupled to the displacement member. The sensor arrangement may be connected via a gear reduction that results in the position sensor 20225 completing one or more revolutions for the full stroke of the displacement member. The position sensor 20225 may complete multiple revolutions for the full stroke of the displacement member.

A series of switches, where n is an integer greater than one, may be employed alone or in combination with a gear reduction to provide a unique position signal for more than one revolution of the position sensor 20225. The state of the switches may be fed back to the microcontroller 20221 that applies logic to determine a unique position signal corresponding to the longitudinal linear displacement d1+d2+ . . . dn of the displacement member. The output of the position sensor 20225 is provided to the microcontroller 20221. The position sensor 20225 of the sensor arrangement may comprise a magnetic sensor, an analog rotary sensor like a potentiometer, or an array of analog Hall-effect elements, which output a unique combination of position signals or values.

The position sensor 20225 may comprise any number of magnetic sensing elements, such as, for example, magnetic sensors classified according to whether they measure the total magnetic field or the vector components of the magnetic field. The techniques used to produce both types of magnetic sensors may encompass many aspects of physics and electronics. The technologies used for magnetic field sensing may include search coil, fluxgate, optically pumped, nuclear precession, SQUID, Hall-effect, anisotropic magnetoresistance, giant magnetoresistance, magnetic tunnel junctions, giant magnetoimpedance, magnetostrictive/piezoelectric composites, magnetodiode, magnetotransistor, fiber-optic, magneto-optic, and microelectromechanical systems-based magnetic sensors, among others.

The position sensor 20225 for the tracking system 20228 comprising an absolute positioning system may comprise a magnetic rotary absolute positioning system. The position sensor 20225 may be implemented as an AS5055EQFT single-chip magnetic rotary position sensor available from Austria Microsystems, AG. The position sensor 20225 is interfaced with the microcontroller 20221 to provide an absolute positioning system. The position sensor 20225 may be a low-voltage and low-power component and may include four Hall-effect elements in an area of the position sensor 20225 that may be located above a magnet. A high-resolution ADC and a smart power management controller may also be provided on the chip. A coordinate rotation digital computer (CORDIC) processor, also known as the digit-by-digit method and Volder's algorithm, may be provided to implement a simple and efficient algorithm to calculate hyperbolic and trigonometric functions that require only addition, subtraction, bit-shift, and table lookup operations. The angle position, alarm bits, and magnetic field information may be transmitted over a standard serial communication interface, such as a serial peripheral interface (SPI) interface, to the microcontroller 20221. The position sensor 20225 may provide 12 or 14 bits of resolution. The position sensor 20225 may be an AS5055 chip provided in a small QFN 16-pin 4×4×0.85 mm package.

The tracking system 20228 comprising an absolute positioning system may comprise and/or be programmed to implement a feedback controller, such as a PID, state feedback, and adaptive controller. A power source converts the signal from the feedback controller into a physical input to the system: in this case the voltage. Other examples include a PWM of the voltage, current, and force. Other sensor(s) may be provided to measure physical parameters of the physical system in addition to the position measured by the position sensor 20225. In some aspects, the other sensor(s) can include sensor arrangements such as those described in U.S. Pat. No. 9,345,481, titled STAPLE CARTRIDGE TISSUE THICKNESS SENSOR SYSTEM, which issued on May 24, 2016, which is herein incorporated by reference in its entirety; U.S. Patent Application Publication No. 2014/0263552, titled STAPLE CARTRIDGE TISSUE THICKNESS SENSOR SYSTEM, which published on Sep. 18, 2014, which is herein incorporated by reference in its entirety; and U.S. patent application Ser. No. 15/628,175, titled TECHNIQUES FOR ADAPTIVE CONTROL OF MOTOR VELOCITY OF A SURGICAL STAPLING AND CUTTING INSTRUMENT, filed Jun. 20, 2017, which is herein incorporated by reference in its entirety. In a digital signal processing system, an absolute positioning system is coupled to a digital data acquisition system where the output of the absolute positioning system will have a finite resolution and sampling frequency. The absolute positioning system may comprise a compare-and-combine circuit to combine a computed response with a measured response using algorithms, such as a weighted average and a theoretical control loop, that drive the computed response towards the measured response. The computed response of the physical system may take into account properties like mass, inertia, viscous friction, inductance resistance, etc., to predict what the states and outputs of the physical system will be by knowing the input.

The absolute positioning system may provide an absolute position of the displacement member upon power-up of the instrument, without retracting or advancing the displacement member to a reset (zero or home) position as may be required with conventional rotary encoders that merely count the number of steps forwards or backwards that the motor 20230 has taken to infer the position of a device actuator, drive bar, knife, or the like.

A sensor 20226, such as, for example, a strain gauge or a micro-strain gauge, may be configured to measure one or more parameters of the end effector, such as, for example, the amplitude of the strain exerted on the anvil during a clamping operation, which can be indicative of the closure forces applied to the anvil. The measured strain may be converted to a digital signal and provided to the processor 20222. Alternatively, or in addition to the sensor 20226, a sensor 20227, such as, for example, a load sensor, can measure the closure force applied by the closure drive system to the anvil. The sensor 20227, such as, for example, a load sensor, can measure the firing force applied to an I-beam in a firing stroke of the surgical instrument or tool. The I-beam is configured to engage a wedge sled, which is configured to upwardly cam staple drivers to force out staples into deforming contact with an anvil. The I-beam also may include a sharpened cutting edge that can be used to sever tissue as the I-beam is advanced distally by the firing bar. Alternatively, a current sensor 20231 can be employed to measure the current drawn by the motor 20230. The force required to advance the firing member can correspond to the current drawn by the motor 20230, for example. The measured force may be converted to a digital signal and provided to the processor 20222.

For example, the strain gauge sensor 20226 can be used to measure the force applied to the tissue by the end effector. A strain gauge can be coupled to the end effector to measure the force on the tissue being treated by the end effector. A system for measuring forces applied to the tissue grasped by the end effector may comprise a strain gauge sensor 20226, such as, for example, a micro-strain gauge, that can be configured to measure one or more parameters of the end effector, for example. In one aspect, the strain gauge sensor 20226 can measure the amplitude or magnitude of the strain exerted on a jaw member of an end effector during a clamping operation, which can be indicative of the tissue compression. The measured strain can be converted to a digital signal and provided to a processor 20222 of the microcontroller 20221. A load sensor 20227 can measure the force used to operate the knife element, for example, to cut the tissue captured between the anvil and the staple cartridge. A magnetic field sensor can be employed to measure the thickness of the captured tissue. The measurement of the magnetic field sensor also may be converted to a digital signal and provided to the processor 20222.

The measurements of the tissue compression, the tissue thickness, and/or the force required to close the end effector on the tissue, as respectively measured by the sensors 20226, 20227, can be used by the microcontroller 20221 to characterize the selected position of the firing member and/or the corresponding value of the speed of the firing member. In one instance, a memory 20223 may store a technique, an equation, and/or a lookup table which can be employed by the microcontroller 20221 in the assessment.

The control system 20220 of the surgical instrument or tool also may comprise wired or wireless communication circuits to communicate with the modular communication hub 20065 as shown in FIG. 5.

Figure 7:
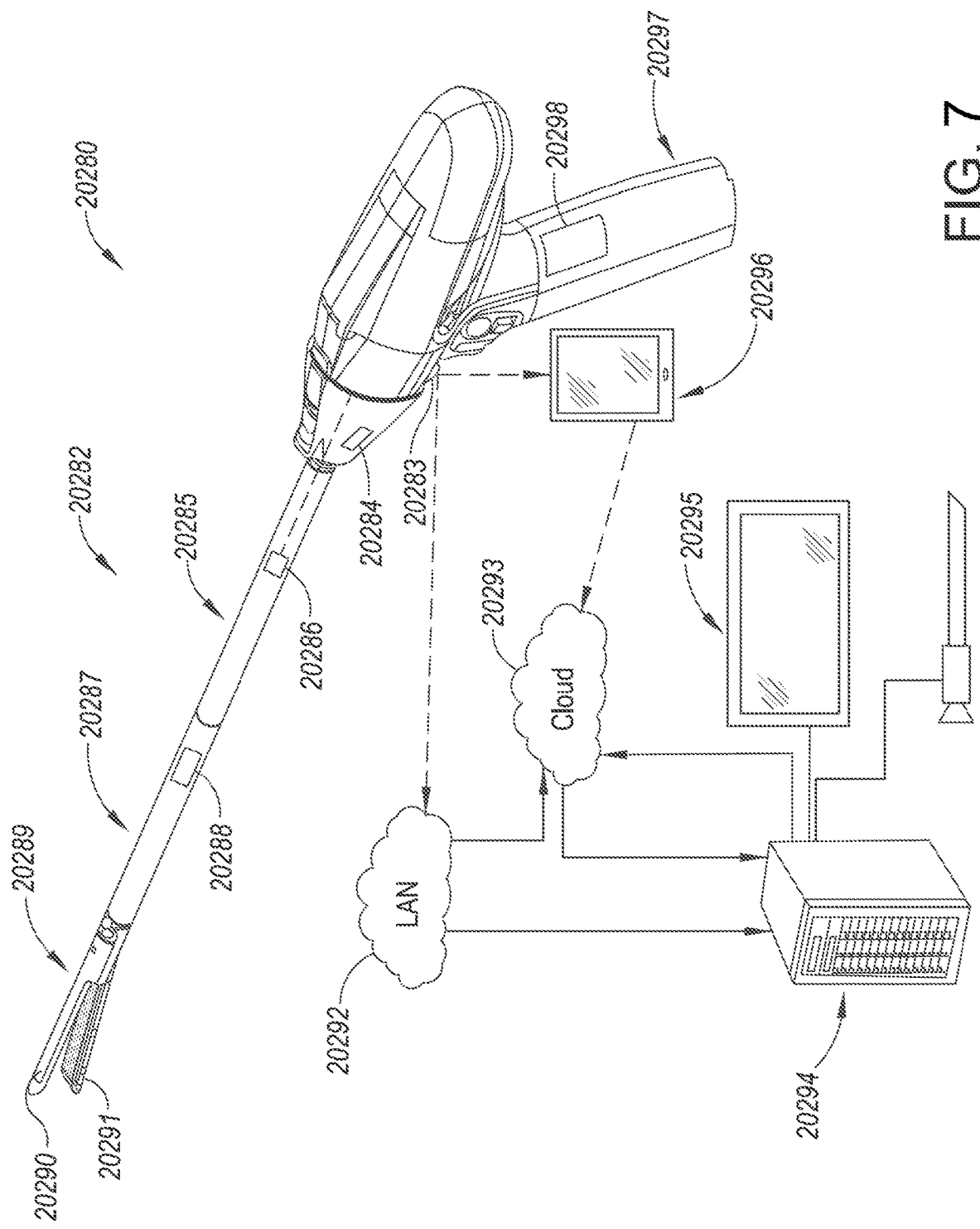
FIG. 7 shows an example surgical system that includes a handle having a controller and a motor, an adapter releasably coupled to the handle, and a loading unit releasably coupled to the adapter.

FIG. 7 illustrates an example surgical system 20280 in accordance with the present disclosure and may include a surgical instrument 20282 that can be in communication with a console 20294 or a portable device 20296 through a local area network 20292 and/or a cloud network 20293 via a wired and/or wireless connection. The console 20294 and the portable device 20296 may be any suitable computing device. The surgical instrument 20282 may include a handle 20297, an adapter 20285, and a loading unit 20287. The adapter 20285 releasably couples to the handle 20297 and the loading unit 20287 releasably couples to the adapter 20285 such that the adapter 20285 transmits a force from a drive shaft to the loading unit 20287. The adapter 20285 or the loading unit 20287 may include a force gauge (not explicitly shown) disposed therein to measure a force exerted on the loading unit 20287. The loading unit 20287 may include an end effector 20289 having a first jaw 20291 and a second jaw 20290. The loading unit 20287 may be an in-situ loaded or multi-firing loading unit (MFLU) that allows a clinician to fire a plurality of fasteners multiple times without requiring the loading unit 20287 to be removed from a surgical site to reload the loading unit 20287.

The first and second jaws 20291, 20290 may be configured to clamp tissue therebetween, fire fasteners through the clamped tissue, and sever the clamped tissue. The first jaw 20291 may be configured to fire at least one fastener a plurality of times or may be configured to include a replaceable multi-fire fastener cartridge including a plurality of fasteners (e.g., staples, clips, etc.) that may be fired more than one time prior to being replaced. The second jaw 20290 may include an anvil that deforms or otherwise secures the fasteners, as the fasteners are ejected from the multi-fire fastener cartridge.

The handle 20297 may include a motor that is coupled to the drive shaft to affect rotation of the drive shaft. The handle 20297 may include a control interface to selectively activate the motor. The control interface may include buttons, switches, levers, sliders, touchscreens, and any other suitable input mechanisms or user interfaces, which can be engaged by a clinician to activate the motor.

The control interface of the handle 20297 may be in communication with a controller 20298 of the handle 20297 to selectively activate the motor to affect rotation of the drive shafts. The controller 20298 may be disposed within the handle 20297 and may be configured to receive input from the control interface and adapter data from the adapter 20285 or loading unit data from the loading unit 20287. The controller 20298 may analyze the input from the control interface and the data received from the adapter 20285 and/or loading unit 20287 to selectively activate the motor. The handle 20297 may also include a display that is viewable by a clinician during use of the handle 20297. The display may be configured to display portions of the adapter or loading unit data before, during, or after firing of the instrument 20282.

The adapter 20285 may include an adapter identification device 20284 disposed therein and the loading unit 20287 may include a loading unit identification device 20288 disposed therein. The adapter identification device 20284 may be in communication with the controller 20298, and the loading unit identification device 20288 may be in communication with the controller 20298. It will be appreciated that the loading unit identification device 20288 may be in communication with the adapter identification device 20284, which relays or passes communication from the loading unit identification device 20288 to the controller 20298.

The adapter 20285 may also include a plurality of sensors 20286 (one shown) disposed thereabout to detect various conditions of the adapter 20285 or of the environment (e.g., if the adapter 20285 is connected to a loading unit, if the adapter 20285 is connected to a handle, if the drive shafts are rotating, the torque of the drive shafts, the strain of the drive shafts, the temperature within the adapter 20285, a number of firings of the adapter 20285, a peak force of the adapter 20285 during firing, a total amount of force applied to the adapter 20285, a peak retraction force of the adapter 20285, a number of pauses of the adapter 20285 during firing, etc.). The plurality of sensors 20286 may provide an input to the adapter identification device 20284 in the form of data signals. The data signals of the plurality of sensors 20286 may be stored within or be used to update the adapter data stored within the adapter identification device 20284. The data signals of the plurality of sensors 20286 may be analog or digital. The plurality of sensors 20286 may include a force gauge to measure a force exerted on the loading unit 20287 during firing.

The handle 20297 and the adapter 20285 can be configured to interconnect the adapter identification device 20284 and the loading unit identification device 20288 with the controller 20298 via an electrical interface. The electrical interface may be a direct electrical interface (i.e., include electrical contacts that engage one another to transmit energy and signals therebetween). Additionally, or alternatively, the electrical interface may be a non-contact electrical interface to wirelessly transmit energy and signals therebetween (e.g., inductively transfer). It is also contemplated that the adapter identification device 20284 and the controller 20298 may be in wireless communication with one another via a wireless connection separate from the electrical interface.

The handle 20297 may include a transceiver 20283 that is configured to transmit instrument data from the controller 20298 to other components of the system 20280 (e.g., the LAN 20292, the cloud 20293, the console 20294, or the portable device 20296). The controller 20298 may also transmit instrument data and/or measurement data associated with one or more sensors 20286 to a surgical hub. The transceiver 20283 may receive data (e.g., cartridge data, loading unit data, adapter data, or other notifications) from the surgical hub 20270. The transceiver 20283 may receive data (e.g., cartridge data, loading unit data, or adapter data) from the other components of the system 20280. For example, the controller 20298 may transmit instrument data including a serial number of an attached adapter (e.g., adapter 20285) attached to the handle 20297, a serial number of a loading unit (e.g., loading unit 20287) attached to the adapter 20285, and a serial number of a multi-fire fastener cartridge loaded into the loading unit to the console 20294. Thereafter, the console 20294 may transmit data (e.g., cartridge data, loading unit data, or adapter data) associated with the attached cartridge, loading unit, and adapter, respectively, back to the controller 20298. The controller 20298 can display messages on the local instrument display or transmit the message, via transceiver 20283, to the console 20294 or the portable device 20296 to display the message on the display 20295 or portable device screen, respectively.

Figure 8:
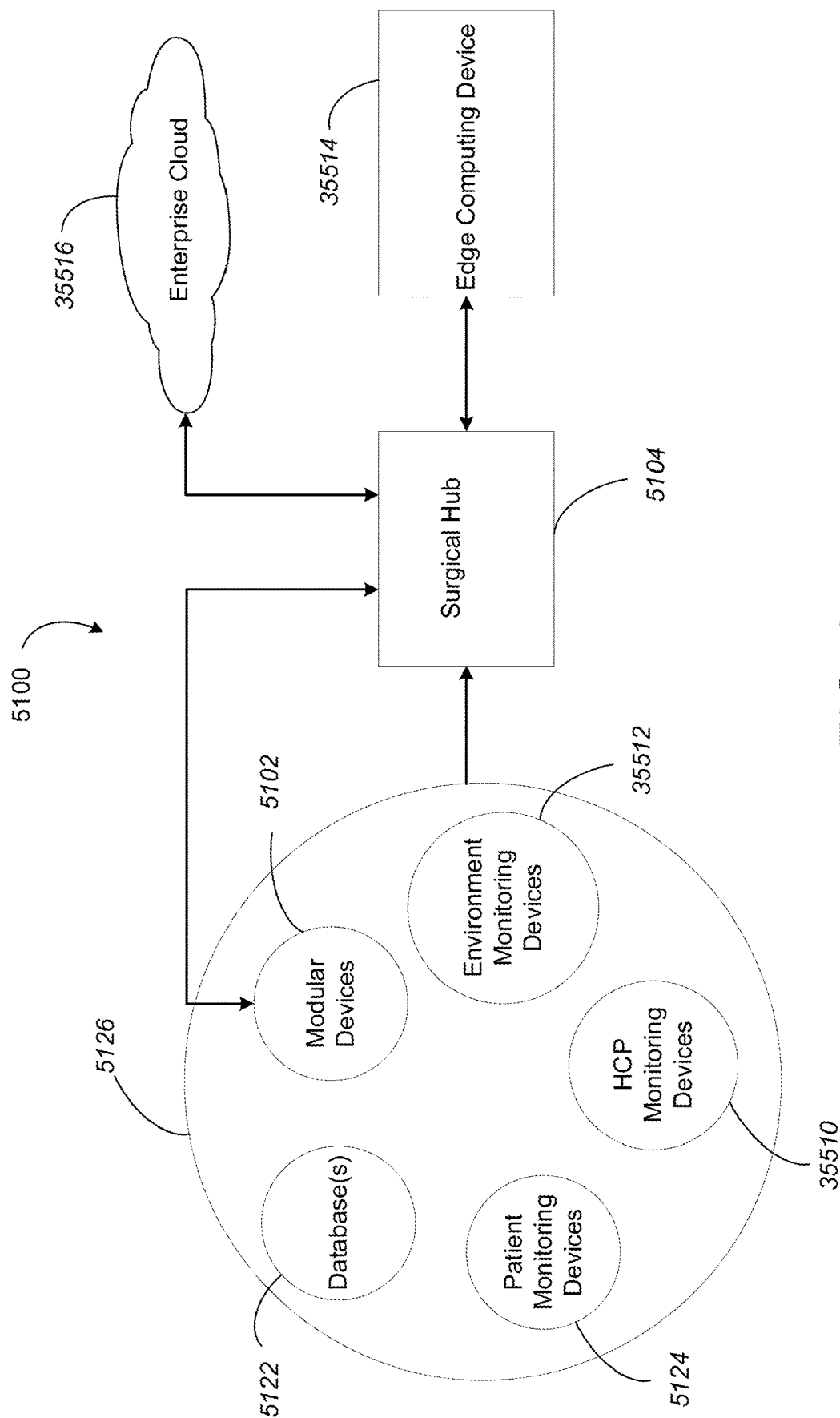
FIG. 8 shows an example situationally aware surgical system.

FIG. 8 illustrates a diagram of a situationally aware surgical system 5100, in accordance with at least one aspect of the present disclosure. The data sources 5126 may include, for example, the modular devices 5102 (which can include sensors configured to detect parameters associated with the patient, HCPs and environment and/or the modular device itself), databases 5122 (e.g., an EMR database containing patient records), patient monitoring devices 5124 (e.g., a blood pressure (BP) monitor and an electrocardiography (EKG) monitor), HCP monitoring devices 35510, and/or environment monitoring devices 35512. The surgical hub 5104 can be configured to derive the contextual information pertaining to the surgical procedure from the data based upon, for example, the particular combination(s) of received data or the particular order in which the data is received from the data sources 5126. The contextual information inferred from the received data can include, for example, the type of surgical procedure being performed, the particular step of the surgical procedure that the surgeon is performing, the type of tissue being operated on, or the body cavity that is the subject of the procedure. This ability by some aspects of the surgical hub 5104 to derive or infer information related to the surgical procedure from received data can be referred to as "situational awareness." For example, the surgical hub 5104 can incorporate a situational awareness system, which is the hardware and/or programming associated with the surgical hub 5104 that derives contextual information pertaining to the surgical procedure from the received data and/or a surgical plan information received from the edge computing system 35514 or an enterprise cloud server 35516.

The situational awareness system of the surgical hub 5104 can be configured to derive the contextual information from the data received from the data sources 5126 in a variety of different ways. For example, the situational awareness system can include a pattern recognition system, or machine learning system (e.g., an artificial neural network), that has been trained on training data to correlate various inputs (e.g., data from database(s) 5122, patient monitoring devices 5124, modular devices 5102, HCP monitoring devices 35510, and/or environment monitoring devices 35512) to corresponding contextual information regarding a surgical procedure. A machine learning system can be trained to accurately derive contextual information regarding a surgical procedure from the provided inputs. In examples, the situational awareness system can include a lookup table storing pre-characterized contextual information regarding a surgical procedure in association with one or more inputs (or ranges of inputs) corresponding to the contextual information. In response to a query with one or more inputs, the lookup table can return the corresponding contextual information for the situational awareness system for controlling the modular devices 5102. In examples, the contextual information received by the situational awareness system of the surgical hub 5104 can be associated with a particular control adjustment or set of control adjustments for one or more modular devices 5102. In examples, the situational awareness system can include a further machine learning system, lookup table, or other such system, which generates or retrieves one or more control adjustments for one or more modular devices 5102 when provided the contextual information as input.

A surgical hub 5104 incorporating a situational awareness system can provide a number of benefits for the surgical system 5100. One benefit may include improving the interpretation of sensed and collected data, which would in turn improve the processing accuracy and/or the usage of the data during the course of a surgical procedure. To return to a previous example, a situationally aware surgical hub 5104 could determine what type of tissue was being operated on; therefore, when an unexpectedly high force to close the surgical instrument's end effector is detected, the situationally aware surgical hub 5104 could correctly ramp up or ramp down the motor of the surgical instrument for the type of tissue.

The type of tissue being operated can affect the adjustments that are made to the compression rate and load thresholds of a surgical stapling and cutting instrument for a particular tissue gap measurement. A situationally aware surgical hub 5104 could infer whether a surgical procedure being performed is a thoracic or an abdominal procedure, allowing the surgical hub 5104 to determine whether the tissue clamped by an end effector of the surgical stapling and cutting instrument is lung (for a thoracic procedure) or stomach (for an abdominal procedure) tissue. The surgical hub 5104 could then adjust the compression rate and load thresholds of the surgical stapling and cutting instrument appropriately for the type of tissue.

The type of body cavity being operated in during an insufflation procedure can affect the function of a smoke evacuator. A situationally aware surgical hub 5104 could determine whether the surgical site is under pressure (by determining that the surgical procedure is utilizing insufflation) and determine the procedure type. As a procedure type can be generally performed in a specific body cavity, the surgical hub 5104 could then control the motor rate of the smoke evacuator appropriately for the body cavity being operated in. Thus, a situationally aware surgical hub 5104 could provide a consistent amount of smoke evacuation for both thoracic and abdominal procedures.

The type of procedure being performed can affect the optimal energy level for an ultrasonic surgical instrument or radio frequency (RF) electrosurgical instrument to operate at. Arthroscopic procedures, for example, may require higher energy levels because the end effector of the ultrasonic surgical instrument or RF electrosurgical instrument is immersed in fluid. A situationally aware surgical hub 5104 could determine whether the surgical procedure is an arthroscopic procedure. The surgical hub 5104 could then adjust the RF power level or the ultrasonic amplitude of the generator (e.g., "energy level") to compensate for the fluid filled environment. Relatedly, the type of tissue being operated on can affect the optimal energy level for an ultrasonic surgical instrument or RF electrosurgical instrument to operate at. A situationally aware surgical hub 5104 could determine what type of surgical procedure is being performed and then customize the energy level for the ultrasonic surgical instrument or RF electrosurgical instrument, respectively, according to the expected tissue profile for the surgical procedure. Furthermore, a situationally aware surgical hub 5104 can be configured to adjust the energy level for the ultrasonic surgical instrument or RF electrosurgical instrument throughout the course of a surgical procedure, rather than just on a procedure-by-procedure basis. A situationally aware surgical hub 5104 could determine what step of the surgical procedure is being performed or will subsequently be performed and then update the control algorithms for the generator and/or ultrasonic surgical instrument or RF electrosurgical instrument to set the energy level at a value appropriate for the expected tissue type according to the surgical procedure step.

In examples, data can be drawn from additional data sources 5126 to improve the conclusions that the surgical hub 5104 draws from one data source 5126. A situationally aware surgical hub 5104 could augment data that it receives from the modular devices 5102 with contextual information that it has built up regarding the surgical procedure from other data sources 5126. For example, a situationally aware surgical hub 5104 can be configured to determine whether hemostasis has occurred (e.g., whether bleeding at a surgical site has stopped) according to video or image data received from a medical imaging device. The surgical hub 5104 can be further configured to compare a physiologic measurement (e.g., blood pressure sensed by a BP monitor communicably connected to the surgical hub 5104) with the visual or image data of hemostasis (e.g., from a medical imaging device communicably coupled to the surgical hub 5104) to make a determination on the integrity of the staple line or tissue weld. The situational awareness system of the surgical hub 5104 can consider the physiological measurement data to provide additional context in analyzing the visualization data. The additional context can be useful when the visualization data may be inconclusive or incomplete on its own.

For example, a situationally aware surgical hub 5104 could proactively activate the generator to which an RF electrosurgical instrument is connected if it determines that a subsequent step of the procedure requires the use of the instrument. Proactively activating the energy source can allow the instrument to be ready for use as soon as the preceding step of the procedure is completed.

The situationally aware surgical hub 5104 could determine whether the current or subsequent step of the surgical procedure requires a different view or degree of magnification on the display according to the feature(s) at the surgical site that the surgeon is expected to need to view. The surgical hub 5104 could proactively change the displayed view (supplied by, e.g., a medical imaging device for the visualization system) accordingly so that the display automatically adjusts throughout the surgical procedure.

The situationally aware surgical hub 5104 could determine which step of the surgical procedure is being performed or will subsequently be performed and whether particular data or comparisons between data will be required for that step of the surgical procedure. The surgical hub 5104 can be configured to automatically call up data screens based upon the step of the surgical procedure being performed, without waiting for the surgeon to ask for the particular information.

Errors may be checked during the setup of the surgical procedure or during the course of the surgical procedure. For example, the situationally aware surgical hub 5104 could determine whether the operating theater is setup properly or optimally for the surgical procedure to be performed. The surgical hub 5104 can be configured to determine the type of surgical procedure being performed, retrieve the corresponding checklists, product location, or setup needs (e.g., from a memory), and then compare the current operating theater layout to the standard layout for the type of surgical procedure that the surgical hub 5104 determines is being performed. In some exemplifications, the surgical hub 5104 can compare the list of items for the procedure and/or a list of devices paired with the surgical hub 5104 to a recommended or anticipated manifest of items and/or devices for the given surgical procedure. If there are any discontinuities between the lists, the surgical hub 5104 can provide an alert indicating that a particular modular device 5102, patient monitoring device 5124, HCP monitoring devices 35510, environment monitoring devices 35512, and/or other surgical item is missing. In some examples, the surgical hub 5104 can determine the relative distance or position of the modular devices 5102 and patient monitoring devices 5124 via proximity sensors, for example. The surgical hub 5104 can compare the relative positions of the devices to a recommended or anticipated layout for the particular surgical procedure. If there are any discontinuities between the layouts, the surgical hub 5104 can be configured to provide an alert indicating that the current layout for the surgical procedure deviates from the recommended layout.

The situationally aware surgical hub 5104 could determine whether the surgeon (or other HCP(s)) was making an error or otherwise deviating from the expected course of action during the course of a surgical procedure. For example, the surgical hub 5104 can be configured to determine the type of surgical procedure being performed, retrieve the corresponding list of steps or order of equipment usage (e.g., from a memory), and then compare the steps being performed or the equipment being used during the course of the surgical procedure to the expected steps or equipment for the type of surgical procedure that the surgical hub 5104 determined is being performed. The surgical hub 5104 can provide an alert indicating that an unexpected action is being performed or an unexpected device is being utilized at the particular step in the surgical procedure.

The surgical instruments (and other modular devices 5102) may be adjusted for the particular context of each surgical procedure (such as adjusting to different tissue types) and validating actions during a surgical procedure. Next steps, data, and display adjustments may be provided to surgical instruments (and other modular devices 5102) in the surgical theater according to the specific context of the procedure.

Medical facilities may contain multiple operating rooms where the operating rooms may be designated for specific medical specialties such as thoracic surgery. Healthcare professionals (HCPs) may use predefined locations within the facility and a predefined set of operating rooms based on the surgery type. Surgical specialties may have a typical instrument mix combined with a set of advanced devices and capital based on the anatomy that is the focus of the surgery. For example, surgical equipment used and/or prepared for a thoracic surgery may be different from the surgical equipment used and/or prepared for a colorectal surgery.

Operating rooms may use procedure-specific surgical hub systems based on the type of surgery. For example, a local hub system for a thoracic operating room may be different from a local hub system for a colorectal operating room. The procedure-specific surgical hub system may include data related to the specific procedure (e.g., thoracic-specific data) such as data of simulations, procedure plans, best-practices, example videos (e.g., for surgical steps), and/or the like.

Hybrid operating rooms may be a specialty operating room that may include a combination of specialized imaging equipment in addition to normal operating room equipment. Robotic theaters may be a specialty operating room with dedicated specialized equipment. Specialty operating rooms may be used based on scheduling. The specialty operating rooms may not contain surgery specific surgical hubs for a given procedure. For example, a thoracic surgery may be scheduled for the specialty operating room, but the specialty operating room may not contain a thoracic hub. A procedure-specific surgical hub may be transported to the specialty operating room. The movement of surgical hubs may interrupt the normal networks, storage, and access of localized data from a group.

Figure 9:
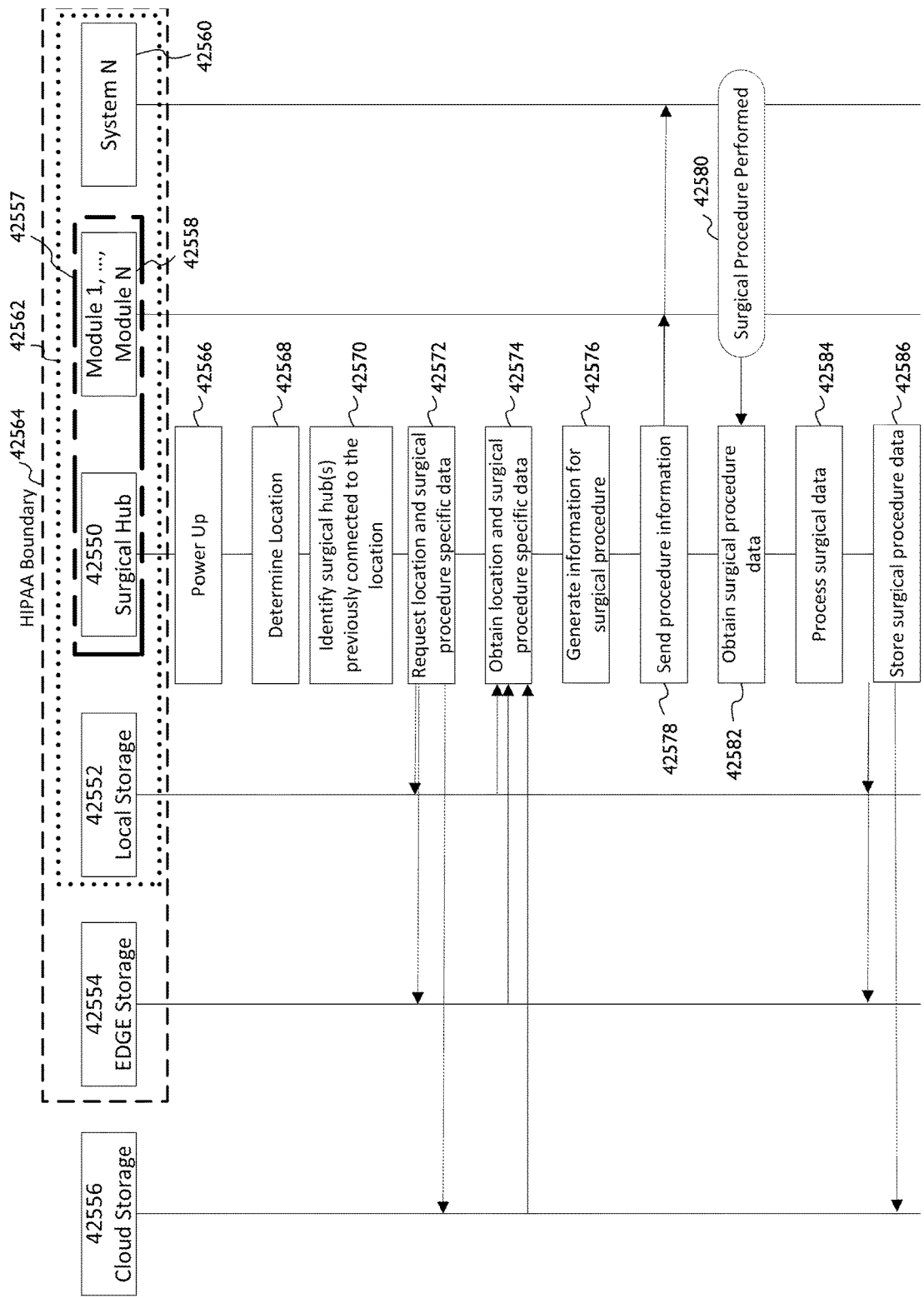
FIG. 9 is an example sequence diagram of a computing system receiving and storing location and surgical procedure specific data.

FIG. 9 is an example sequence diagram of a computing system receiving and storing location and surgical procedure specific data. A surgical computing system may be a surgical hub 42550. The surgical hub 42550 may communicate with one or more data storages to obtain and/or store data. The one or more data storages may include a local storage 42552, an edge network storage 42554, and/or a cloud network storage 42556. The surgical hub 42550 that is part of a first surgical system 42557 may communicate with other surgical systems 42560 (e.g., surgical hubs and/or modules associated with other surgical systems) or modules 42558 associated with the surgical systems. The surgical hub 42550 may be located within an operating room 42562. The operating room 42562 may include the surgical hub 42550, local storage 42552, modules 42558, and/or surgical system 42560. The operating room 42562 and the edge network storage 42554 may be located within a HIPAA boundary 42564. A Health Insurance Portability and Accountability Act (HIPAA) boundary 42564 may prevent private data from being communicated outside of a medical facility, for example, without proper redaction of the private information. The cloud storage 42556 associated with the surgical system may be located outside of the HIPAA boundary 42564, as illustrated in FIG. 9.

The computing system (e.g., a surgical computing system) and/or surgical hub 42550 may include a surgical hub 20002 as described herein with respect to FIG. 2. For example, the surgical computing system may include at least one of the following: a surgical hub 20006 in communication with a cloud computing system 20008, for example, as described in FIG. 2. The surgical computing system may include at least one of the following: a surgical hub 20006 or a computing device 20016 in communication with a cloud computing system 20008. The computing system may be or may include an HCP monitoring system such as the HCP monitoring system 20000, 20002, 20003, or 20004 as described herein with respect to FIGS. 1-3. The computing system may be a computing system operatively connected to the HCP monitoring system(s) 20000, 20002, 20003, and/or 20004. The computing system may be or may include the computing system 20271 described herein with respect to FIG. 9. The computing system may be or may include the computer system 20063 described herein, for example, with respect to FIG. 4.

The data storage(s) may be a local data storage 42552, an edge network storage 42554, a cloud network storage 42556, a surgical hub storage, a medical department storage, and/or the like. The data storage(s) may be located within the HIPAA boundary 42564. For example, the data storages located within the medical facility, such as the local storage 42552, edge network storage 42554, surgical hub storage, medical department storage, may be located within the HIPAA boundary 42564. The cloud network storage 42556 may be located outside the HIPPA boundary 42564. The cloud network storage 42556 may include or may be the remote cloud storage unit 20010 as described herein with respect to FIG. 2.

The HIPAA boundary 42564 may refer to an area where electronic health care transactions, such as data transfer, may be subject to the Health Insurance Portability and Accountability Act (HIPAA). HIPAA may establish baseline safeguards for ensuring confidentiality, integrity, and availability of protected health information (PHI). PHI may include personally identifiable information, such as mental health history, healthcare services, payments for healthcare, and/or other identifiable information (e.g., patient's name, address, or Social Security number). Protected health information (PHI) may undergo redaction and/or removal of identifying information. Data with PHI transferred outside of the HIPAA boundary must remove and/or redact the PHI associated with the data. Processing of private data may be performed within the HIPAA boundary, for example. For example, surgical hubs within the medical facility and HIPAA boundary may transfer data between themselves without removing and/or redacting PHI because it is within the HIPPA boundary. For example, a surgical hub transferring data to a cloud network outside the HIPPA boundary may perform a check that the PHI associated with the data is removed and/or redacted before the transfer.

The surgical hub 42550 may be connected to multiple modules 42558. The surgical hub 42550 and modules 42558 may be included within the first surgical system 42557. The modules may be or may be included within a hub modular enclosure, which may be the hub modular enclosure 20060 as described herein with respect to FIG. 3. The modules 42558 may be one or more of an imaging module, generator module, smoke evacuation module, suction/irrigation module, communication module, processor module, storage array module, operating room mapping module, and/or the like, as described herein with respect to FIG. 3. The hub modular enclosure may facilitate communication between the modules within the hub modular enclosure. The surgical hub may communicate the various connected modules, for example, to perform a surgical procedure.

The surgical hub 42550 and/or first surgical system 42557 may be connected to multiple external surgical systems 42560. The external surgical systems may include surgical equipment, surgical instruments, other surgical hubs, sensing systems, monitoring systems, and/or the like. For example, the external surgical systems 42560 may be or may include any of the surgical systems as described herein with respect to FIG. 2. For example, the external surgical systems may include sensing systems such as patient sensing systems, surgeon sensing systems, environmental sensing systems, and/or the like. The external surgical systems may include other surgical hubs, for example, that may be located in a different operating room.

As shown at 42566 in FIG. 9, a surgical hub may be powered up. At 42568, the surgical hub may determine its geographic location, which may be an operating room (OR), for example. At 42570, the surgical hub may identify surgical hubs previously connected to the geographic location. For example, a previously connected surgical hub may have been used for a surgical procedure in the OR previously. The previously connected surgical hub may be currently connected at a different geographic location, such as a different OR or a specialized OR. At 42572, the surgical hub may send a request for location and/or surgical procedure specific data, for example, from one or more data storages. At 42574, the surgical hub may obtain the requested location and/or surgical procedure specific data. At 42576, the surgical hub may generate information for performing a surgical procedure, for example, using the obtained location and surgical procedure specific data. At 42578, the surgical hub may send the procedure information (e.g., in the form of a control program to modules or external systems). At 42580, a surgical procedure may be performed. At 42582, the surgical hub may obtain surgical procedure data associated with the surgical procedure being performed. At 42584, the surgical hub may process the surgical procedure data. At 42586, the surgical hub may send the surgical procedure data for storage, for example, to one or more data storages.

The surgical hub may determine its geographic location. The geographic location may be located within the medical facility. For example, the geographic location may be located on a specific floor in the medical facility. The geographic location may be associated with a medical department or medical specialty, such as the thoracic, colorectal, or bariatric department, for example. The geographic location may be an operating room. The operating room may be associated with a designated surgical procedure. For example, the surgical hub may determine its geographic location to be in an operating room designated for hysterectomies.

The surgical hub may determine its geographic location, for example, based on nearby surgical systems. For example, the surgical hub may identify surgical equipment and/or surgical instruments that are located nearby or connected to the surgical hub. The surgical hub may identify a medical practice area associated with the surgical instrument mix and/or surgical equipment. For example, the surgical hub may determine that its geographic location is a hybrid-OR based on the presence of specialized imagine equipment and normal OR equipment. For example, the surgical hub may determine that its geographic location is a robotic theater.

The surgical hub may determine and/or identify a second surgical hub. For example, the surgical hub may determine and/or identify a second surgical hub that was previously located in the geographic location that the surgical hub is located. The second surgical hub may have been previously located in an OR but moved to a hybrid-OR, and the surgical hub replaced the second surgical hub in the OR. The surgical hub may determine and/or identify the second surgical hub based on the determined geographic location. The surgical hub may determine and/or identify previously connected surgical hubs and/or devices that were connected or located in the determined geographic location.

For example, a main surgical hub may be associated with an OR, such as a thoracic surgery OR. The main surgical hub may be moved to a hybrid-OR, for example, to enable imaging to be used in combination with the main hub for surgery. A rotating surgical hub may be moved into the thoracic surgery OR to replace the main surgical hub while the main surgical hub is in the hybrid-OR. The rotating hub may power up in the thoracic surgery OR, and the rotating hub may determine and/or identify its geographic location. The rotating hub may determine/identify surgical hubs previously located in that thoracic surgery OR using the geographic location. For example, the rotating hub may determine/identify the main surgical hub as being previously located within the same thoracic surgery OR.

The surgical hub may send a request for location and surgical procedure specific data. Location and surgical procedure specific data may be data associated with a geographic location, for example, where the data may have been generated. For example, the location and surgical procedure specific data may be associated with a particular OR, such as a thoracic surgery OR. The location and surgical procedure specific data may be data associated with a specific surgical procedure, such as a hysterectomy, for example. The location and surgical procedure specific data may be data generated from a surgical procedure (e.g., previously performed surgical procedure) in a geographic location. The location and surgical procedure specific data may include data pertaining to a medical practice area, such as colorectal surgeries.

For example, the location and surgical procedure specific data may be data generated from a surgical instrument during a colorectal surgery in a specific operating room. For example, a surgical procedure, such as a colorectal surgery, may be performed in an OR. Surgical procedure data may be generated based on the surgical procedure. The surgical procedure data may be tagged with data indicating the procedure performed and the geographic location that the procedure was performed. The surgical procedure data may be associated with metadata indicating the procedure performed and the geographic location that the procedure was performed. The surgical procedure data may be linked back to the surgical procedure performed and the geographic location.

The location and surgical procedure specific data may include data associated with sensing systems, such as patient sensing systems, surgeon sensing systems, environmental sensing systems, and/or the like. The data associated with the patient sensing systems and/or surgeon sensing systems may include biomarker data, movement data, positioning data, and/or the like. For example, the location and surgical procedure specific data may include heart rate biomarker data generated during a surgical procedure in a particular OR. The heart rate biomarker data may be tagged with the geographic location and surgical procedure, for example, for future reference and/or analysis.

The location and surgical procedure specific data may be associated with a surgeon. For example, the location and surgical procedure specific data may be associated with the surgical procedures performed by a particular surgeon. The location and surgical procedure specific data may include the surgeon's preferences, surgical instrument settings used for a surgical procedure, procedure simulations and plans viewed by the surgeon, videos, annotations, and/or transcriptions associated with the surgeon, and/or the like. For example, the surgeon may use a particular set of surgical instrument settings for a surgical procedure. The location and surgical procedure specific data may include the particular set of surgical instrument settings. For example, the location and surgical procedure specific data may include surgeon preferences for the procedure, OR setup layout and plans, instrument instructions for use, local area network topography and equipment for cooperative access, procedure simulations and plans, specific patient data for upcoming or previous surgeries, example videos, annotations, transcriptions for the surgery, algorithms, transformations, analyses, and applications relative to specialized equipment in the OR, OR utilization data, OR identifying and tracking data, and/or the like.

The surgical hub may request the location and surgical procedure specific data from one or more data storages, such as a local storage, an edge network storage, a cloud storage unit, and/or the like, for example. The surgical hub may send separate requests to each of the data storages, for example, based on the data storage. For example, the local storage 42552 and/or edge network storage 42554 may be located within the HIPPA boundary, and the cloud network storage 42556 may be located outside the HIPAA boundary. The cloud network storage 42556 may include data that is stripped of private information, for example, to comply with HIPAA guidelines. Based on the privacy associated with the cloud network storage, the surgical hub may send a separate request to the cloud network storage from the request to the local storage and/or edge network storage (e.g., as shown in FIG. 9).

The surgical hub may obtain the location and surgical procedure specific data, for example, based on the request. The surgical hub may obtain the location and surgical procedure specific data from the data storage(s). The surgical hub may process the location and surgical procedure specific data. The surgical hub may generate information and/or control programs for a surgical procedure using the location and surgical procedure specific data. The surgical hub may generate information for the surgical procedure, for example, to provide instructions for modules and/or surgical systems. For example, the surgical hub may generate instructions for using a surgical instrument in a surgical procedure based on the location and surgical procedure specific data. The instructions may be associated with surgical instrument settings data in the location and surgical procedure specific data, for example, that were used in a previous surgery. For example, the surgical hub may generate information for displaying during a surgical procedure, such as surgical procedure models, simulations, procedure steps, instructions, and/or the like.

The surgical hub may send generated control programs, for example, to the modules. The control programs, for example, may aid the modules and/or surgical systems in a surgical procedure. The modules may be connected to the surgical hub and may perform services and/or surgical processes. For example, the surgical hub may be connected to a smoke evacuation module in an operating room. The surgical hub may send control programs, based on the location and procedure specific data, for the smoke evacuation module during the surgical procedure. For example, the control programs may configure the smoke evacuation module to operate, such as removing air particles in the OR, during the surgical procedure. Air particles may be generated, for example, if an energy device is in operation during a surgical procedure. The control programs may configure the smoke evacuation module to operate based on detection of air particles above a threshold.

The surgical hub may send the generated information and/or control programs, for example, to surgical systems. The generated information and/or control programs may be used, for example, to perform a surgical procedure. The surgical systems may be located within the OR. The surgical systems may include surgical equipment, surgical instruments, surgical imaging systems, surgical robots, and/or the like. The surgical systems may include surgical hubs located in a different OR, which may or may not be within the same department or medical specialty. For example, the surgical hub may generate information and/or control programs for a surgical procedure and send it to a different surgical hub in a different OR. The different surgical hub in the different OR may perform surgical procedures using the sent information and/or control programs.

A surgical procedure may be performed, for example, using a surgical hub, modules associated with the surgical hub, surgical systems, and/or the like. Data associated with the surgical procedure may be generated, for example, by the modules and/or surgical systems associated with the surgical procedure. The surgical procedure data may include surgical instrument data, surgical equipment data, biomarker data (e.g., patient biomarker data and HCP biomarker data), OR layout data, surgical plan data, patient data, and/or the like. The surgical hub may receive the surgical hub data, for example, during the surgical procedure and/or as it is generated.

The surgical hub may process the surgical procedure data. For example, the surgical hub may filter and segment the surgical procedure data. The surgical hub may filter and segment types of data as it is obtained. The surgical hub may filter and segment types of data based on the usage location of the data. The usage location of the data may include the geographic location where the generated information and/or control programs are used to perform the surgical procedure. The usage location of the data may include the location where the data was generated, for example, where the surgical procedure was performed.

The surgical hub may filter and segment types of data based on the associated sensing system, module, surgical system, surgical instrument, surgical equipment, and/or the like, that generated and/or collected the data. The surgical hub may filter and segment types of data, for example, based on the HCP performing the surgical procedure. For example, the surgical hub may filter and segment data associated with a particular surgical instrument within an OR. The surgical hub may filter and segment data, such as duration of use and/or number of uses, associated with a surgical instrument.

The surgical hub may process the surgical procedure data, for example, based on the surgeon performing the surgical procedure and/or the OR staff associated with the surgical procedure. For example, the surgical hub may tag the obtained surgical procedure data with the lead surgeon. The tag may indicate that the data is associated with the surgeon who performed the surgical procedure. Analysis of the data may indicate trends of the surgeon during a particular surgical procedure. For example, a surgeon with relatively more experience may perform many successful surgical procedures which other surgeons aim to model. Surgeons, such as surgeons with relatively less experience, may access data associated with the surgeon with relatively more experience to model their surgical plans and procedures for optimization.

The surgical hub may process the surgical procedure data, for example, by determining a classification associated with the data. The data classification may be associated with security. For example, the classifications may include restricted data, public data, confidential data (e.g., private data protected by HIPAA), and/or the like. Restricted data may be sensitive data that may cause great risk if compromised. Public data may be non-sensitive data that may cause little or no risk to an entity, if accessed. Confidential or private data may be moderately sensitive data that may cause a moderate risk to the entity, if compromised. Data classification may group data according to the level of sensitivity associated with the data. Security controls and access methods may be used based on the data classification. For example, fewer security measures may be used for public data compared to the security measures used for restricted data. Restricted data may be associated with security measures limiting access to a need-to-know basis. Public data may be associated with loose security measures and/or no security measures. Confidential or private data may be associated with security measures limiting access to internal use, such as access limited to a company or department owning the data.

The classification may be associated with HIPAA data classification. HIPAA may establish baseline safeguards for ensuring confidentiality, integrity, and availability of protected health information (PHI). PHI may include personally identifiable information, such as mental health history, healthcare services, payments for healthcare, and/or other identifiable information (e.g., patient's name, address, or Social Security number). For example, the surgical hub may process data based on the associated HIPAA data classification. The surgical hub may determine that obtained surgical procedure data is associated with PHI and classify the data as confidential. Processing private data (e.g., aggregated procedure reduction with private data) may be performed within the facility. Processing of private data may be performed within the HIPAA boundary, for example. Protected health information (PHI) may undergo redaction and/or removal of identifying information. The surgical hub may process data such that PHI is redacted and/or has identifying information removed.

The surgical hub may process the surgical procedure data, for example, by performing encryption. Encryption may include transforming data into a form that may be unreadable, for example, without a decryption and/or decryption key. Encryption may ensure privacy by keeping information inaccessible without proper clearances. Authorized access may be permitted by using a decryption. Encryption may use symmetric encryption or asymmetric encryption. Symmetric encryption may use an encryption key and a decryption key where the encryption key and the decryption key are the same. Asymmetric encryption may use unique keys to both encrypt and decipher information. Encryption may include hashing.

Authorized users may access data based on security classifications. Different authentication and/or access levels may be used to access different security classifications. For example, the highest access level may access all data, but a low access level may access public data (e.g., only public data). Access and/or authentication may be performed using a subscription and/or tier package that may grant access to a user for a given data storage. For example, the hospital network may be granted access to all storage locations. For example, a device manufacturer may be granted access to device-use data and/or device errors data (e.g., only device-use data and/or device errors data). For example, a reordering entity may have access to data associated with reordering/resupplying equipment and/or devices. The surgical hub may perform hashing. The surgical hub may perform hashing, for example, to create unique signatures which may be used to identify parties accessing information and tracking any changes made.

The surgical hub may store the processed surgical procedure data, for example, in data storage(s). For example, the surgical hub may store the processed surgical procedure data in the local storage associated with the OR, the edge network storage, the cloud network storage, the internal surgical hub storage, and/or the like. The surgical hub may write data or store data in separate data storage locations, for example, based on the type of data, classification data, associated security assigned to the data, and/or the like. The processed surgical procedure data may be redundant or distributed in data storages. The stored surgical procedure data may be stored for future use, for example, for future surgical procedures. The stored surgical procedure data may be used, for example, by a surgical hub requesting the data based on usage location and sending it to modules and systems for a surgical task.

For example, the surgical hub may store surgical procedure data based on usage location. The surgical hub may obtain surgical procedure data. The surgical procedure data may be associated with modules, surgical systems, surgical equipment, and/or surgical instruments in an operating room. The surgical hub may process the surgical procedure data, such as tagging the surgical procedure data with usage location data. The usage location data may include the OR the surgical procedure data was generated, the type of OR the surgical procedure was generated, the surgeon who performed the surgical procedure, and/or the like. The surgical hub may store surgical procedure data based on the determined usage location for future use. The stored surgical procedure data may be retrieved at a later point, such as for a future surgical procedure. For example, a surgical hub may request location and surgical procedure specific data associated with a particular OR and a particular surgical procedure. The surgical hub may request the location and surgical procedure specific data to use for an upcoming surgical procedure.

For example, the surgical hub may store surgical procedure data based on classification. The surgical hub may obtain surgical procedure data. The surgical hub may determine a classification for the data, such as restricted, public, or confidential, for example. The surgical hub may determine which data storages to store the data based on the classification. The surgical hub may store data within the HIPAA boundary without removing PHI or confidential information. For example, the surgical hub may store patient PHI in internal surgical hub storage, local storage associated with an OR, a medical department storage within the medical facility, the edge network storage, and/or any other storage within the HIPAA boundary. The surgical hub may redact confidential information and/or PHI associated with surgical procedure data. The redacted data may be stored in data storages outside the HIPAA boundary, such as the cloud network storage, for example.

Confidential information and/or PHI associated with data may be protected by encryption. For example, the data may be encrypted to prevent unauthorized access to the data. Writing or transferring encrypted data may be slower than writing on unencrypted data, for example, because a writing operating may go through an encryption algorithm. The surgical hub may determine a storage located based on the classification. For example, the surgical hub may determine that confidential information be stored within the HIPAA boundary, such as in the edge data storage. The surgical hub may determine not to store the confidential information in the cloud network storage, for example, because the process of encrypting the data to comply with HIPAA rules would be inefficient or use resources that may be better suited for other tasks. The surgical hub may be configured with different data storages, such as local or cloud based, for example, based on classification of the data. The data storage may be configured with different segments within a hard drive that may be partitioned based on security levels. For example, the surgical hub may obtain data, process the data (e.g., based on the type and classification of the data), and redirect the data to an appropriate storage reservoir.

The surgical hub may write data in data storages associated with edit permissions. For example, a data storage may be associated with edit permissions, such as read-only or write-once. Read-only permissions may indicate that data may not be edited or modified. Write-once permissions may indicate that data may be edited once and/or edited in a certain manner. For example, write-once permissions may allow data to be updated in a certain manner, such as updating a usage time and/or number. Data storages may include read-only access portions with once-write sections, such as for permanent indexing of the number of uses or duration of use, for example. A surgical hub may have once-write or permanent write sections of a memory, for example, enabled to monitor usage time, number of uses, and/or other parameters that may determine life span, service updates, and/or operational issues.

For example, a data storage may have a section associated with write-once permissions. Once-write permissions may allow information to be written, but not modified. The section associated with write-once permissions may be associated with surgical instrument data, such as number of uses, for example. The once-write permissions may allow a surgical hub to store information relating to a number of times the surgical instrument was used. The number may be used for maintenance purposes of the surgical instrument. For example, the surgical hub may store information relating to the number of uses a surgical instrument has performed since last maintenance. The number may indicate that the surgical instrument is due for maintenance.

The surgical hub may send surgical procedure data, for example, to the edge network. The surgical hub may send surgical procedure data to the edge network for processing. The edge network may process the data more efficiently than the surgical hub. The edge network may be located within the HIPAA boundary. The edge network, based on the location within the HIPAA boundary, may process confidential and/or private data, for example.

In examples, a surgical hub may obtain location and surgical procedure specific data to use in a surgical procedure and may store data from the surgical procedure based on usage location for use in future surgical procedures. The surgical hub may be moved to a thoracic OR, for example. The surgical hub may generate surgical procedure information and/or control programs based on the location and surgical procedure specific data, for example, for use in a surgical procedure. The surgical hub may send the generated surgical procedure information and/or control programs to one or more modules and/or systems associated with a surgical procedure. The system(s) may include surgical hubs in other ORs. For example, the surgical hub may send the generated surgical procedure information and/or control programs to a different surgical hub located in a different OR (e.g., within the same surgical hub network), and the data may be used for a surgical procedure being performed in the different OR. The generated surgical procedure information and/or control programs may include surgeon preferences, OR setup layout(s) and plans, instrument instructions for use, procedure simulations and plans, and/or the like, which may be used in the surgical procedure. The surgical hub may obtain surgical procedure data associated with the surgical procedure, which may be performed in the thoracic OR or the different OR. The surgical hub may process the obtained surgical procedure data, for example, by classifying the data. The surgical hub may store the processed surgical procedure data, for example, in one or more data storages, for example, based on usage location and/or classification. For example, the surgical hub may store the processed surgical procedure data based on the surgical procedure data being generated in the thoracic OR and/or the different OR. The stored surgical procedure data may be used in future surgical procedures. For example, the stored surgical procedure data may be sent when a surgical hub requests the location and surgical procedure specific data for the OR that the stored surgical procedure data was generated in.

In examples, the surgical hub may be configured with automatic transfer protocols. The automatic transfer protocols may enable the surgical hub to transfer data across systems when the surgical hub moves to different locations. For example, the surgical hub may move room to room and request location and surgical procedure specific data (e.g., automatically request location and surgical procedure specific data) associated with the room it is moved to. For example, the surgical hub may move from a first OR to a second OR. The surgical hub, when connected to the second OR, may automatically request location and surgical procedure specific data associated with the second OR. The surgical hub may store the location and surgical procedure specific data associated with the second OR in internal surgical hub storage and/or may send the location and surgical procedure specific data to modules and/or surgical systems in the second OR and/or a different OR (e.g., such as one in the same surgical hub network).

In examples, a main surgical hub routinely used in a thoracic surgery OR may be moved to a hybrid-OR, for example, such that imaging may be used in combination with the main surgical hub for surgery. A rotating surgical hub may be moved into the thoracic OR (e.g., theater) where the main surgical hub was previously located, for example, to act as a replacement for that OR while the main surgical hub is in the hybrid-OR. The rotating surgical hub may power up (e.g., connect) in the thoracic OR. On power up, the rotating surgical hub may request and download all the location and surgical procedure specific data (e.g., local storage data) that the main surgical hub had in the thoracic OR. For example, the location and surgical procedure specific data may include data associated with the thoracic OR, such as surgeon preferences, OR setup layout(s) and plan(s), instrument instructions for use, local area topography and equipment for cooperative access, procedure simulation(s) and plan(s), specific patient data for upcoming and/or previous surgeries, example videos, example annotations, example transcriptions, algorithms, transformations, analyses, and/or applications relative to specialized equipment in the OR, OR utilization data, OR identifying and tracking data, and/or the like. The rotating surgical hub receiving the location and surgical procedure specific data may enable other surgical hubs (e.g., other surgical hubs within the hub network, such as other thoracic surgical hubs) that may have regularly communicated with the main surgical hub to have access to the resources, for example, that they may have used for surgical procedures. For example, other surgical hubs may obtain location and surgical procedure specific data that the main surgical hub used in surgical procedures, such as previously viewed simulations and/or procedures, surgical procedure setup, and/or user preferences.

In examples, a surgical hub to be used by a surgeon with relatively less experience may obtain the user preferences associated with a surgical hub that was used by a surgeon with relatively more experience. A surgeon with relatively more experience may use a particular OR, and the surgeon with relatively more experience may use a different OR. The surgical hub in the OR of the surgeon with relatively less experience may request location and surgical specific data associated with the OR and surgical hub of the surgeon with relatively more experience and surgical hub. The surgical hub of the surgeon with relatively less experience may obtain the data from one or more data storages, which may include the surgical hub of the surgeon with relatively more experience. The location and surgical procedure specific data may include data that the surgeon with relatively more experience uses for surgical procedures, such as preferred surgical models, surgical instrument settings, OR layout, and/or the like. The surgical hub of the surgeon with relatively less experience may obtain the location and surgical procedure specific data of the surgeon with relatively more experience and may use the data in an upcoming surgical procedure.

The surgical hub may communicate with modules, external surgical systems, and/or other surgical hubs, for example, in a surgical hub network. The surgical hub network may include multiple surgical hubs located within the medical facility, such as, for example, different operating rooms. The surgical hub may provide services to other surgical hubs and/or transfer data with the other surgical hubs within the surgical hub network. The surgical hub may provide data processing services, for example, to modules, external surgical systems, and/or other surgical hubs that are in a high utilization phase of operation (e.g., a surgical hub during an important and/or critical surgical procedure step) or have limited processing capabilities (e.g., a biomarker sensing system). The surgical hub may prove data transfer services, for example, such as receiving data from modules, external surgical systems, and/or other surgical hubs and sending the received data to the edge network or cloud network. Transferring data between surgical hubs in a hub network may use less processing power than transferring data from a surgical hub to the edge network or cloud network. For example, to conserve processing capacity, a surgical hub may receive surgical procedure data to be processed at the edge network tier from a different surgical hub in a high utilization phase of operation (e.g., during an important and/or critical procedure step) and transfer the surgical procedure data to the edge network tier.

Figure 10:
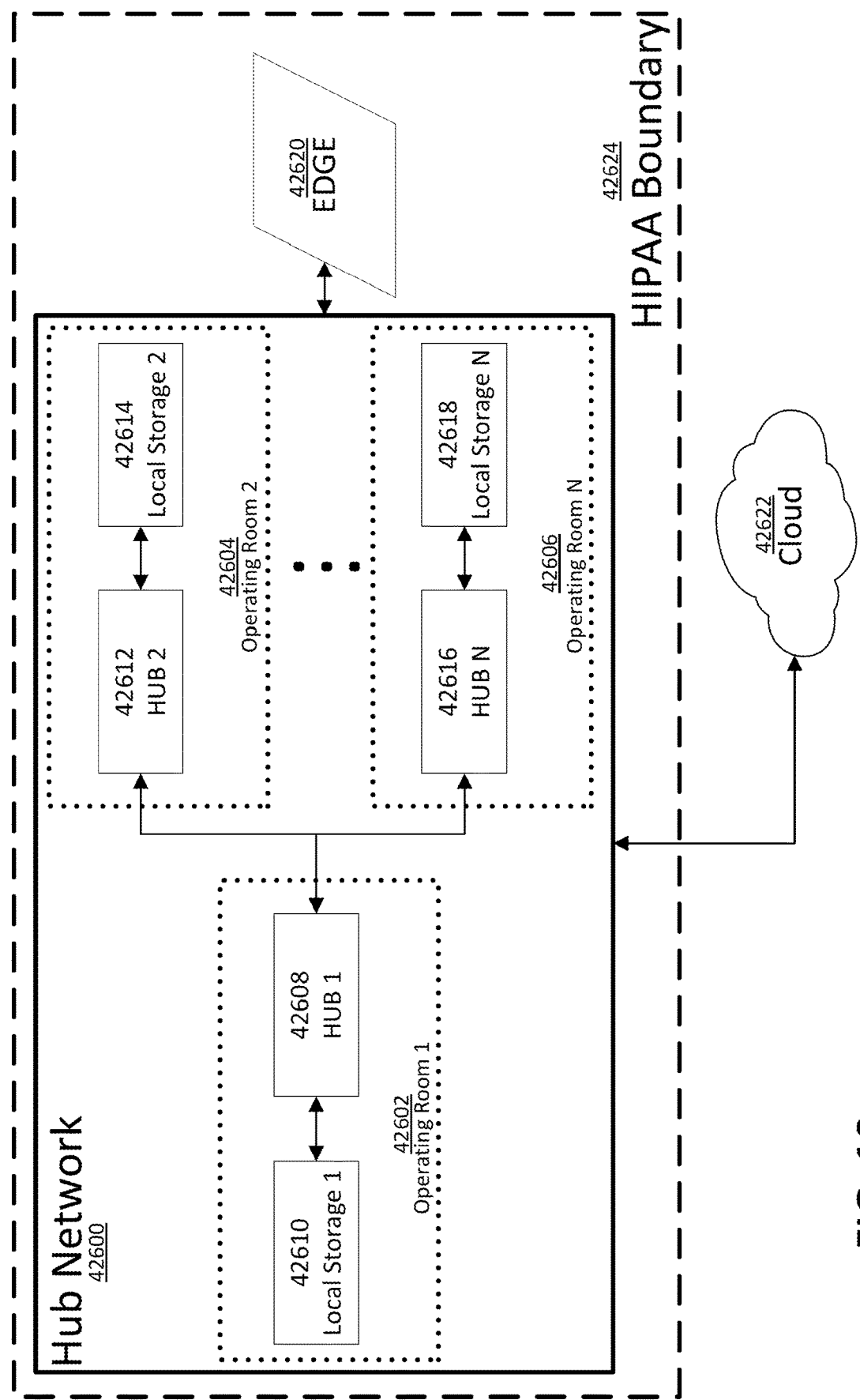
FIG. 10 illustrates an example surgical hub network.

FIG. 10 illustrates an example surgical hub network. A hub network 42600 may include a plurality of surgical hubs within a medical facility. The medical facility may include multiple operating rooms, such as a first operating room 42602, a second operating room 42604, and up to an Nth operating room 42606. Each operating room may include a hub and a local data storage. For example, the first OR 42602 may have a first hub 42608 and first local data storage 42610, the second OR 42604 may have a second hub 42612 and second local data storage 42614, and the Nth OR 42606 may have an Nth surgical hub 42616 and Nth local data storage 42618. The hub network 42600 may communicate with other tiers, such as the edge tier 42620 and/or the cloud tier 42622. As shown in FIG. 10, a HIPAA boundary 42624 may be a boundary that prevents private data from being communicated outside of a medical facility, for example, without proper removal of the private information. The HIPAA boundary 42624 may include the hub network 42600 and/or the edge tier 42620.

The surgical hub network may enable communication between surgical hubs within the network. For example, the first surgical hub 42608 in the first operating room 42602 may provide services to the second surgical hub 42612 in the second operating room 42604. The services provided may include data processing, data storage, data transfer, and/or the like. For example, the second surgical hub 42612 may be performing a surgical procedure and generating surgical procedure data. The second surgical hub 42612 may be performing a critical step in the surgical procedure, for example, such that the second surgical hub 42612 devotes its processing capacity to the procedural step. For example, the second surgical hub 42612 may pause surgical procedure data transfer to the edge tier and/or cloud tier during the critical surgical procedure step. The second surgical hub 42612 may transfer the surgical procedure data to the first surgical hub 42608. Transferring data between devices within the hub network may be faster than transferring data from a surgical hub to the edge tier and/or cloud tier. For example, transferring the data to the first surgical hub 42608 in the hub network may be performed faster than transferring the data to the edge tier or cloud tier. This way, the second surgical hub 42612 spends less time transferring data during the critical surgical procedure step and may focus on the critical surgical procedure step.

Surgical hubs within the hub network may act as and/or provide redundant local storage. The surgical hubs within the hub network may act as and/or provide redundant local storage, for example, based on storage means and distributed storage locations. For example, the surgical hub may act as and/or provide redundant local storage of short-term data and/or long-term data. The short-term data may include data awaiting upload to the edge tier and/or cloud tier. The long-term data may include user preferences, operational algorithms, recently connected systems, and/or the like. A surgical hub within the hub network may include multiple storage locations, for example, arrayed in a raid array and/or using a similar redundant backup method.

The hub network may enable distributed storage between surgical hubs within the hub network. For example, if a local surgical hub has more capacity than other surgical hubs within the same hub network, the local surgical hub may configure itself to act as a distributed storage means within the local hub network. For example, if the local surgical hub has less utilization than other surgical hubs within hub network, the local surgical hub may configure itself to act as a distributed storage means within the hub network.

The local surgical hub may provide momentary storage, for example, acting as a momentary storage node, for the hub network and/or for other surgical hubs. The momentary storage may be provided, for example, until the hub network or local surgical hub transfer the data to the edge tier and/or cloud tier. The local surgical hub may provide momentary storage, for example, until the hub network and/or other surgical hubs enter a lower utilization phase of operation. For example, the hub network may pause transferring data to the edge tier and/or cloud tier. The pause may occur based on the hub network or surgical hubs within the networking entering a high utilization phase of operation. The local surgical hub may receive data and act as a momentary storage node until the hub network resumes transferring data to the edge tier and/or cloud tier.

Figure 11:
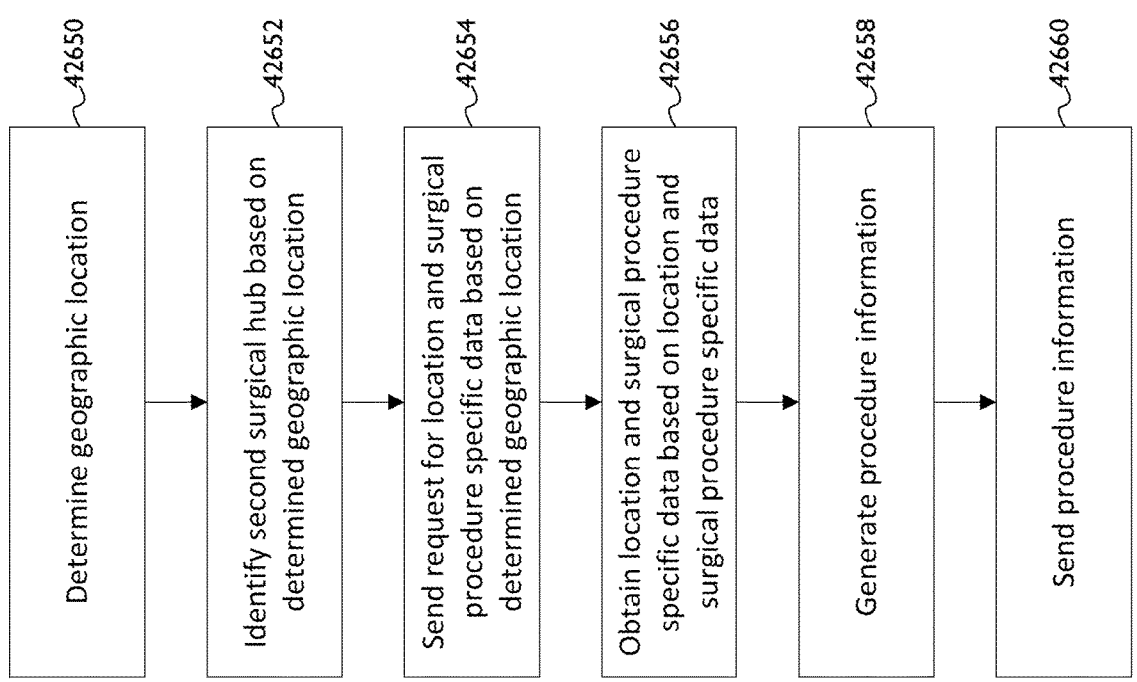
FIG. 11 is a flow diagram of example processing associated with receiving location and surgical procedure specific data and generating procedure information for a surgical procedure.

FIG. 11 is a flow diagram of example processing associated with receiving location and surgical procedure specific data and generating procedure information for a surgical procedure. The processing may be performed by a surgical hub, a computing system, and/or the like. As shown at 42650 in FIG. 11, a geographic location may be determined. The geographic location may be associated with a first surgical hub. The geographic location may be located within a medical facility.

At 42652 in FIG. 11, a second surgical hub may be identified and/or determined, for example, based on the second surgical hub being previously connected at the determined geographic location. For example, the second surgical hub may have been previously connected in the OR associated with the geographic location to perform surgical procedures. The second surgical hub may have been moved from the geographic location to a different geographic location and may be connected at a different OR. In examples, the second surgical hub may have been moved from an OR to be connected at a specialty OR.

At 42654 in FIG. 11, a request for location and surgical procedure specific data may be sent. The location and surgical procedure specific data may include any data associated with the determined geographic location. The location and surgical procedure specific data may include data associated with a particular type of surgical procedure performed in the geographic location. The request for data may be sent to one or more data storages, such as, for example, a local storage, edge network storage, cloud storage unit, surgical hub storage, and/or the like. The cloud storage may be located outside the HIPAA boundary.

At 42656 in FIG. 11, data, such as the location and surgical procedure specific data, may be obtained, for example, from the one or more data storages. At 42658 in FIG. 11, procedure information may be generated, for example, based on the obtained location and surgical procedure specific data. The procedure information may include information for performing a surgical procedure. For example, the procedure information may include surgeon preferences, OR setup layout and plans, surgical instrument instructions, surgical instrument settings, procedure simulations and plans, specific patient data for upcoming or previous surgeries, example videos, annotations, and/or transcriptions, algorithms, transformations, and/or analyses relative to specialized equipment in the OR, OR utilization data, OR identifying and tracking data, and/or the like. For example, based on the obtained location and procedure specific data, surgical procedure information may be generated, such as device settings for a surgical stapler.

At 42660 in FIG. 11, the generated procedure information may be sent, for example to module(s) and/or surgical system(s). The generated procedure information may be sent to a module connected to a surgical hub, which may be associated with performing a surgical procedure. The procedure information may be sent to an external surgical system associated with performing the surgical procedure. The procedure information may be sent to a surgical hub, such as one in a different geographic location (e.g., different OR), associated with performing the surgical procedure.

Figure 12:
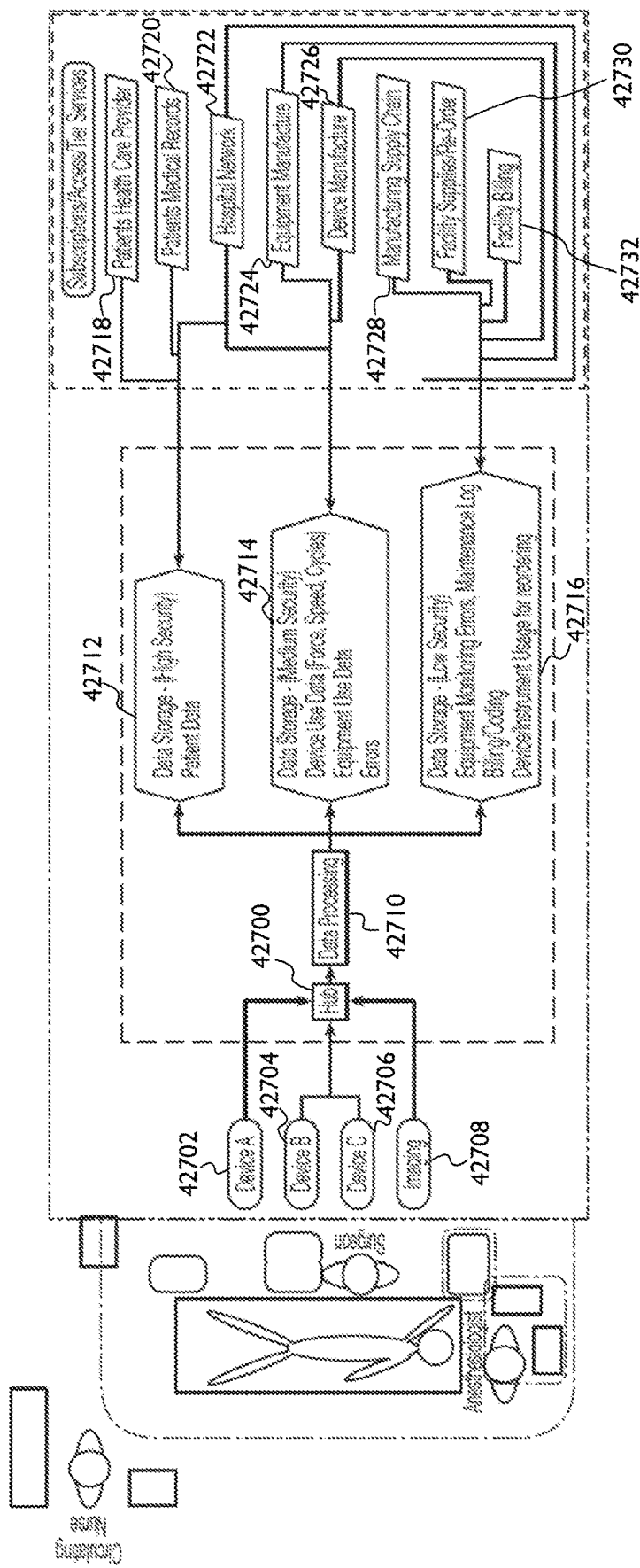
FIG. 12 illustrates an example tiered access model for retrieving data generated by a surgical procedure.

FIG. 12 illustrates an exemplary tiered access model for retrieving data generated by a surgical procedure. As shown on the left of FIG. 12, a surgical procedure may be performed in an operating room. The surgical procedure may be performed using a surgical hub 42700. The surgical procedure may be performed using surgical instruments and/or surgical equipment, such as Device A 42702, Device B 42704, Device C 42706, and an imaging device 42708. The surgical instruments and/or surgical equipment may generate data throughout the surgical procedure and may send the surgical procedure data to the surgical hub 42700. As shown at 42710, the surgical hub may process the surgical procedure data. The surgical hub 42700 may send the processed surgical procedure data to one or more data storages, such as a high security data storage 42712, a medium security data storage 42714, and/or a low security data storage 42716. The one or more data storages may be accessed, for example, by medical entities (e.g., hospital network), device manufacturer entities, and/or the like. The one or more data storages may be a local storage, surgical hub storage, operating room storage, medical department storage, edge tier storage, cloud tier storage, and/or the like. The one or more data storages may be located within the HIPAA boundary.

The surgical hub may process the surgical procedure data, for example, by assigning classifications to the data based on the type of data. The assigned classifications may include security classifications, such as high security, medium security, and/or low security. Types of data associated with high security may include patient data, protected health information, and/or the like. Types of data associated with medium security may include device use data, such as force, speed, and/or cycles associated with the device use, equipment use data, device errors, and/or the like. Types of data associated with low security may include equipment monitoring errors, maintenance logs, billing and/or coding, device/instrument usage for reordering, and/or the like. The surgical hub may classify the surgical procedure data based on the sensitivity of the data.

For example, the surgical hub may assign sensitivity classifications, such as restricted, public, confidential or private, and/or the like. Restricted information may include sensitive data that may cause great risk if the data is compromised. The restricted information may be accessed based on a need-to-know basis. Public information may include non-sensitive data that may cause little or no risk if the data is compromised. The public information may be associated with loose or uncontrolled data access. Confidential or private information may include moderately sensitive data that may cause a moderate risk if the data is compromised. The confidential or private information may be accessed by the company internally and/or by the department that owns the data.

The data storage(s) may be accessed, for example, by entities, such as, for example, medical entities, device manufacturer entities, and/or the like. For example, as shown in on the right portion of FIG. 12, the entities may include the patient health care provider 42718, the patient medical records department 42720, the hospital network 42722, the equipment manufacturer 42724, the device manufacturer 42726, the manufacturing supply chain 42728, the facility supplies/re-ordering department 42730, the facility billing department 42732, and/or the like. The entities may have an access level corresponding with the data storages. For example, an entity may be granted access to the low security data storage(s) (e.g., only the low security data storage(s)). The entity may be granted access to the high security data storage(s), which may include access to the medium security and low security data storage(s).

For example, surgical procedure data may be generated based on a performed surgical procedure. The surgical procedure data may be processed, for example, by the surgical hub. The processed surgical procedure may be sent (e.g., diverted) to a defined storage reservoir (e.g., data storage), for example, based on a classification of the data. The data stored in the storage reservoirs may be accessed, for example, by entities that are granted access to the data storage.

The one or more data storages may be accessed, for example, based on a subscription/tier package. Entities may be granted and/or assigned an access level and/or permission. The access level and/or permission may allow the entities to access certain data storages. For example, an entity with highest access permissions may access all data storage locations, such as the high security, medium security, and lor security data storages. An entity may be limited to accessing low security data storage(s) based on the access level. For example, the hospital network may be granted access to all storage locations. For example, a device manufacturer may be granted access to data storage(s) associated with device use data and/or device errors reported data. For example, a reordering department may be granted access to data storage(s) associated with device/instrument usage for reordering data.

The data storage(s) may include multiple levels and/or sections of data storage. For example, the data storage(s) may include multiple levels and/or sections of data storage based on data security needs. The multiple levels and/or sections may be associated with data security levels and/or access permissions. The data storage(s) may use a multi-level secure vault control of data, for example, based on the data source, data confidentiality, usage needs, risk of misuse, authentication of user level, and/or the like. The data storage(s) may be monitored, for example, for unauthorized intrusions. The data storage(s) may use multi-level access keys, for example, to provide varying access levels to restricted data. Secured internal system data associated with the data storage system and the data storage system's operation may be included.

FIG. 13 illustrates an example multi-level security system for a data storage. At 42750, a user may access the data storage. The user may access the data storage with a first level of access permission 42752. Authentication/authorization may be performed for a user accessing the data storage. Based on the access permissions of the user, such as a second level of access permission 42756 or a third level of access permission 42758, the user may access different levels of the data storage. The second level of access permission 42756 may grant limited access to the data storage. The third level of access permission 42758 may grant full access to the data storage. A user with the second level of access permission 42756 may access the limited access portion of the data storage 42760. A user with the third level of access permission 42758 may access the full access portion of the data storage 42762 and the limited access portion of the data storage 42760.

As shown in FIG. 13, the limited access portion of the data storage 42760 may include anonymized data 42764, facility shared analysis/conclusions data 42766, procedure-outcome general data 42768, configuration management data 42770, and/or the like. The facility shared analysis/conclusions data 42766 may include data for new device improvements 42772. The procedure-outcome general data 42768 may include data for new reimbursement of procedure 42774 and/or best practices procedure design 42776. The configuration management data 42770 may include data for surgical hub and edge configuration management 42778 and/or hub and edge maintenance 42780. The full access portion of the data storage 42762 may include access to edge and/or cloud data 42782, accessible hub stored data 42784, surgeon access to simulation and plan data 42786, and/or electronic medical records (EMR) database access 42788. The access to the edge and/or cloud data 42782 may include data associated with value and outcome analyses 42790, ordering efficiency 42792, and/or staffing utilization 42794.

Secured data extraction may be provided. Secured data extraction may be provided, for example, based on authentication, needs, and/or usage. The data storages may use secured data access controls, for example, for moving data into and out of the system. Secured access control may be a security technique which may regulates who and/or what can view data.

Secured access control methods may include physical and/or logical secured access control. Physical access control may limit access to the facility, buildings, rooms, physical IT assets, and/or the like. Logical access control may limit connections to computer networks, system files, data, and/or the like. Access control systems may perform identification authentication and authorization of users, for example, by evaluating login credentials. The login credentials may include passwords, personal identification numbers, biometric scans, security tokens, and/or similar authentication factors. Secured access control may minimize security risk, such as unauthorized access to physical and/or logical systems. Secured access control models may include mandatory access control (MAC), discretionary access control (DAC), role-based access control (RBAC), rule-based access control, and/or the like.

Mandatory access control may be a security model where access rights may be regulated, for example, by a central authority based on multiple levels of security. The surgical hub may use MAC, for example, as access controls for data going in and/or out of the surgical hub. The surgical hub may use MAC, for example, to control which entity is allowed to have data permissions, such as read-only permissions or read and write permissions. In an example, a video may be recorded during a surgical procedure and stored in the data storage. Certain credentials and/or access permissions may allow access to the recorded video. For example, the surgeon may have access permissions to review the video and/or edit the video prior or after the video is archived. Other entities may have access permissions to review the video but not edit the video. In an example, a circulating nurse and/or a surgeon may be granted access to pull a correct procedure planned for a surgery. In an example, a scrub nurse may be granted access to check off on tracking and/or using equipment after the surgical procedure is completed before the data is transferred to the central database.

Discretionary access control may be an access control method, for example, which may allow owners and/or administrators of the protected system, data, and/or resource, set policies defining who or what is authorized to access the resource.

Role-based access control may be an access control method that may restrict access, for example, to computer resources. RBAC may restrict access to computer resources, for example, based on individuals or groups with defined business functions rather than identities of individual users. RBAC may use a structure of role assignments, role authorizations, and/or role permissions which may be developed using role engineering, for example, to regulate employee access to systems.

The surgical hub may use RBAC, for example, to control incoming and/or outgoing data between the surgical hub and the cloud and/or other internal networks. RBAC may control restricted and/or confidential data, such as patient data, that may not be accessible unless the user with access was within a defined distance from the surgical hub. RBAC may allow access to be controlled using a radio frequency identification (RFID) chip with a surgeon's ID badge. For example, OR video surveillance may be used as a verification, for example, based on facial recognition. The facial recognition may confirm and/or allow access and/or the exchange of data between the surgical hub and other systems and/or visibility and use of the data.

The surgical hub may use RBAC, for example, to communicate with interfacing equipment and/or devices that are attached and/or identified within the room. For example, RBAC may allow steps-for-use, equipment, and/or devices to be altered and/or modified within the set range controlled by the manufacturer. RBAC may be used to control which steps-for-us and/or device information are permitted to be pulled from the cloud, which may minimize the amount of data needed to be downloaded to the surgical hub.

Rule-based access control may be an access control model, for example, that may allow the system administrator to define the rules that govern access to resource objects.

What is claimed is:

1. A first surgical hub comprising, a processor configured to:
   determine a first geographic location associated with the first surgical hub, wherein the first geographic location is within a medical facility;
   determine a second surgical hub based on the first geographic location and an upcoming surgical procedure to be performed in the first geographic location, wherein the second surgical hub is located in a second geographic location, wherein the second surgical hub was used to perform a previous surgical procedure located in the first geographic location, and wherein the first geographic location is different from the second geographic location;
   send a request to a data storage, wherein the request is associated with location and surgical procedure specific data, wherein the location and surgical procedure specific data is associated with the first geographic location and the upcoming surgical procedure to be performed in the first geographic location, and wherein the location and surgical procedure specific data is associated with the second surgical hub;
   obtain, from the data storage, the location and surgical procedure specific data associated with the second surgical hub, wherein the location and surgical procedure specific data was generated by the second surgical hub in the first geographic location;
   generate information for performing the upcoming surgical procedure using at least part of the location and surgical procedure specific data; and
   send, based on the obtained location and surgical procedure specific data, one or more control programs to one or more modules or systems associated with the first surgical hub, wherein the one or more modules or systems are configured to operate one or more motors based on the one or more control programs.

2. The surgical hub of claim 1, wherein the data storage is a cloud network storage, an edge network storage, a storage in an operating room network, or a surgical system.

3. The surgical hub of claim 1, wherein the surgical hub, an edge computing system, or the data storage is within a Health Insurance Portability and Accountability Act (HIPAA) boundary.

4. The surgical hub of claim 1, wherein the surgical procedure is a colorectal surgical procedure, a thoracic surgical procedure, a bariatric surgical procedure, or a hysterectomy.

5. The surgical hub of claim 1,
   wherein the first geographic location within the medical facility is an operating room; and
   wherein the location and surgical procedure specific data associated with the first geographic location comprises historic surgical procedure data associated with the operating room, wherein the historic surgical procedure data comprises one or more of data associated with an operating room setup, data associated with one or more surgical instruments, a surgical simulation, a surgical procedure plan, or a user preference.

6. The surgical hub of claim 1, wherein the processor is further configured to:
   obtain surgical procedure data associated with a usage location based on the surgical procedure; and
   send the surgical procedure data to the data storage based at least on the usage location.

7. The surgical hub of claim 6, wherein the usage location is the first geographic location.

8. The surgical hub of claim 6, wherein the processor is further configured to:
- determine a classification associated with the surgical procedure data; and
- send the surgical procedure data to the data storage based at least in part on the determined classification associated with the surgical procedure data.

9. The surgical hub of claim 8, wherein the classification associated with the surgical procedure data is determined based on a data type, wherein the data type is restricted, public, or private.

10. The surgical hub of claim 1, wherein the data storage comprises a plurality of levels of data storage, wherein the plurality of levels of data storage are associated with respective data security access levels.

11. The surgical hub of claim 1, wherein the data storage is associated with an access control model, wherein the access control model is mandatory access control (MAC), discretionary access control (DAC), role-based access control (RBAC), or rule-based access control.

12. The surgical hub of claim 1, wherein the processor is further configured to:
- determine a first utilization level associated with the surgical hub and a second utilization level associated with the second surgical hub;
- determine whether the first utilization level is less than the second utilization level;
- based on the determination that the first utilization level is less than the second utilization level, obtain surgical procedure data from the second surgical hub; and
- send the obtained surgical procedure data to an edge computing system.

13. The surgical hub of claim 1, wherein the data storage comprises one or more storage sections, wherein the one or more storage sections has one of a read only permission, a write-once permission, or a full write permission.

14. A method comprising:
- determining a first geographic location associated with a first surgical hub, wherein the first geographic location is within a medical facility;
- determining a second surgical hub based on the first geographic location and an upcoming surgical procedure to be performed in the first geographic location, wherein the second surgical hub is located in a second geographic location, wherein the second surgical hub was used to perform a previous surgical procedure in the first geographic location, and wherein the first geographic location is different from the second geographic location;
- sending a request to a data storage, wherein the request is associated with location and surgical procedure specific data, wherein the location and surgical procedure specific data is associated with the first geographic location and the upcoming surgical procedure to be performed in the first geographic location, and wherein the location and surgical procedure specific data is associated with the second surgical hub;
- obtaining, from the data storage, the location and surgical procedure specific data from the data storage associated with the second surgical hub, wherein the location and surgical procedure specific data was generated by the second surgical hub in the first geographic location;
- generating information for performing the upcoming surgical procedure using at least part of the location and surgical procedure specific data; and
- sending, based on the obtained location and surgical procedure specific data, one or more control programs to one or more modules or systems associated with the first surgical hub, wherein the one or more modules or systems are configured to operate one or more motors based on the one or more control programs.

15. The method of claim 14, wherein the data storage is a cloud network storage, an edge network storage, a storage in an operating room network, or a surgical system.

16. The method of claim 14, wherein the surgical hub, an edge computing system, or the data storage is within a Health Insurance Portability and Accountability Act (HIPAA) boundary.

17. The method of claim 14,
- wherein the first geographic location within the medical facility is an operating room; and
- wherein the location and surgical procedure specific data associated with the first geographic location comprises historic surgical procedure data associated with the operating room, wherein the historic surgical procedure data comprises one or more of data associated with an operating room setup, data associated with one or more surgical instruments, a surgical simulation, a surgical procedure plan, or a user preference.

18. The method of claim 14, further comprising:
- obtaining surgical procedure data associated with a usage location based on the surgical procedure; and
- sending the surgical procedure data to the data storage based at least on the usage location.

19. The method of claim 14, further comprising:
- determining a classification associated with the surgical procedure data; and
- sending the surgical procedure data to the data storage based at least in part on the determined classification associated with the surgical procedure data.

20. The method of claim 14, wherein the data storage comprises a plurality of levels of data storage, wherein the plurality of levels of data storage are associated with respective data security access levels.

* * * * *